United States Patent [19]
Watanabe et al.

[11] 3,916,271
[45] Oct. 28, 1975

[54] ELECTRIC VIBRATION TYPE COMPRESSOR

[75] Inventors: Ryoichi Watanabe; Yukio Okuda; Hiroyuki Kainuma; Kenzi Hayashi; Toshio Izumi, all of Tokyo, Japan

[73] Assignee: Sawafuji Electric Co. Ltd., Tokyo, Japan

[22] Filed: Oct. 3, 1974

[21] Appl. No.: 511,581

[30] Foreign Application Priority Data
Apr. 26, 1974 Japan.............................. 49-47194
Apr. 22, 1974 Japan.............................. 49-45360
Oct. 6, 1973 Japan.............................. 48-112722

[52] U.S. Cl. ............................................. 318/132
[51] Int. Cl.² ....................................... H02K 33/12
[58] Field of Search ........... 318/119, 135, 122, 126, 318/129, 132, 133; 310/15; 331/116

[56] References Cited
UNITED STATES PATENTS
3,056,910  10/1962  Hajian.............................. 318/132 X
3,515,966  6/1970  De Valroger et al........... 318/132 X
3,729,691  4/1973  Beiswinger et al............... 318/132 X Primary Examiner—R. N. Envall, Jr.

[57] ABSTRACT

An electric vibration type compressor comprising a mechanical vibration system having a drive coil and at least one spring which is resonant with the motion of the drive coil, and an electric vibration system having at least one switching element which performs switching control with variable factors in the electric vibration system varying in relation to the vibration of the drive coil, the switching control being conducted under the condition that $$I_C \geq h_{FE} \cdot I_B$$

where
- $I_C$: the output current of the switching element
- $I_B$: the control current of the switching element
- $h_{FE}$: the current amplification factor of the switching element, the electric vibration type compressor being controlled so that abnormal oscillation of the electric vibration system is eliminated during the initial starting operation of the electric vibration type compressor.

25 Claims, 37 Drawing Figures

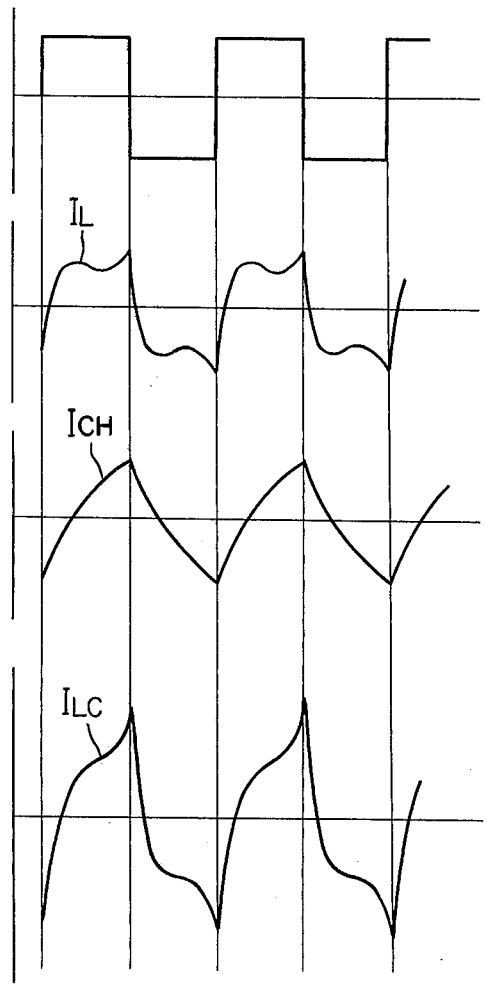

ELECTRIC VIBRATION TYPE COMPRESSOR

FIELD OF THE INVENTION:

The present invention relates generally to an electric vibration type compressor, and more specifically, to an electric vibration type compressor which is controlled so that the resonating conditions between the mechanical vibration system and electric vibration system may be properly established during the initial starting period of the electric vibration type compressor.

BACKGROUND OF THE INVENTION:

Electric vibration type compressors based on the operating principle utilizing the resonance between the vibration of a mechanical vibration system and that of an electric vibration system have so far been widely used in small-sized houshold refrigerators and portable refrigerators for automobiles and pleasure boats mainly because of (1) simple construction, (2) small size and light weight, (3) low starting current, (4) high power factor, and (5) low power consumption. Particularly, in a portable refrigerator which is powered by small-capacity batteries, the electric vibration type compressor has to be driven through a DC-AC inverter.

However, the characteristics required for such an inverter are not so simple as can be otained merely by fabricating an inverter circuit having an oscillation frequency equal to the vibrating frequency of the mechanical vibration system.

The inverter circuit for such a compressor shoud e constructed so that the electric vibration system may perform switching operation properly corresponding to the motion of a piston moved by the vibration of the compressor, whose top and bottom dead centers are asymmetrical, and that the switching element may perform switching control under the condition that $$I_C \gtreqqless h_{FE} \cdot I_B$$

where
- $I_C$: the output current of the switching element,
- $I_B$: the control current of the switching element, and
- $h_{FE}$: the current amplification factor of the switching element.

Even in this case, some technical problems remain to be solved. When the same square wave oscillating voltage is applied to the drive coil of the electric vibration type compressor, the drive current waveform during the initial starting period of the compressor may differ from the drive current waveform during steady operation. Consequently, the switching element which is to operate under the condition that $$I_C \gtreqqless h_{FE} \cdot I_B$$

may perform switching in an unwanted mode during the initial starting period, causing abnormal oscillation, with the consequence that the compressor cannot properly enter the steady operating condition.

SUMMARY OF THE INVENTION

It is, accordingly, an object of the present invention to provide an electric vibration type compressor in which the abovementioned technical problems have been solved.

Another object of the present invention is to provide an electric vibration type compressor which is designed to prevent abnormal oscillation during the initial starting period by selecting the waveforms of the currents $I_B$ and $I_C$.

It is a further object of the present invention to provide an electric vibration type compressor which is designed to prevent abnormal oscillation by increasing the current $I_B$ for a while after the switching element is turned on.

It is a still further object of the present invention to provide an electric vibration type compressor which is designed to prevent abnormal oscillation by setting in advance the current $I_B$ to a large value, and decreasing the current $I_B$ for a predetermined period after the switching element is turned on.

It is also an object of the present invention to provide an electric vibration type compressor which is designed to prevent abnormal oscillation by compensating the output current of the electric vibration system, or changing the waveform of the current $I_C$ through the addition of a compensating current to the current fed to the drive coil.

These together with other objects of the present invention which will become subsequently apparent reside in the details of construction and operation as more fully hereinafter described in the specification and shown in the several drawings.

DESCRIPTION OF THE PRIOR ART:

Electric vibration type compressors have been generally used as compressors for refrigerators installed in pleasure boats and recreational vehicles such as camping cars and motor homes etc. Most of them are operated by small-capacity batteries aboard these vehicles and boats, and therefore, require converters for converting d-c current to a-c current as power sources for the compressors.

From this point of view, compressors used for the above-mentioned purposes are required to have;
1. excellent power consumption efficiency because of the use of small-capacity batteries, and
2. a small sized and lightweight body including the drive device.

An electric vibration type compressor based on the resonance phenomenon between mechanical and electrical vibrations has been developed to meet these requirements, and is widely used for the abovementioned purposes. Although a device of this type uses the resonance phenomenon between mechanical and electrical vibrations, the device cannot always be operated in the best resonating condition because the electrical vibration period of the drive unit does not coincide with the mechanical vibration period due to changes in the discharge and suction pressures of the refrigerant gas caused by changes in the ambient temperature and other conditions of the refrigerator. The mechanical vibration period also changes due to the mechanical conditions of the resonance spring such as lack of uniformity at the time of manufacture and secular changes in the natural vibration period to the mechanical vibration system of the compressor. Semiconductor type compressor drive devices have been used to conveniently supply the compressor with a-c power from the batteries. As one of such drive devices, a drive device comprising a four-transistor bridge and a transformer is known. In this device, transistors opposing each other are caused to turn on and off alternately as a pair to supply the compressor drive coil with converted alternating current. In controlling the transistors, a base current of a constant level is fed to transistors, to cause the transistors to switch based on the principle that the transistors are in the saturation region when they are in the switching condition that $$I_C \geqq h_{FE} \cdot I_B \quad (1)$$

where $I_C$ is the collector current, $I_B$ is the base current, and $h_{FE}$ is the current amplification factor of the switching transistors, and they are shifted to the active region when $$IC > h_{FE} \cdot I_B \quad (2)$$

A compressor of this type is driven most efficiently when the switching frequency (electric vibration period) coincides with the mechanical vibration period of the mechanical vibration system (consisting of a piston, cylinder and resonance coil spring etc) of the compressor. However, the waveform of the drive current of the compressor during starting differs from that during steady operation, and the magnitude of the drive current during staring is relatively larger than that during steady operation. Therefore, if the switching frequency in a conventional drive device of the compressor is selected (or the level of the base current is selected) depending on the drive current during steady current, the drive device operates in such a manner that the switching fequency during starting becomes higher than that during steady operation. Consequently, the vibration period of the electric vibration system does not coincide with that of the mechanical vibration system, with the consequence that the drive device cannot stably proceed to steady operation. In other words, abnormal oscillation occurs.

BRIEF DESCRIPTION OF THE DRAWINGS:

FIGS. 24 and 26A through 26D are diagrams showing the operation of these embodiments.

Figure 1:
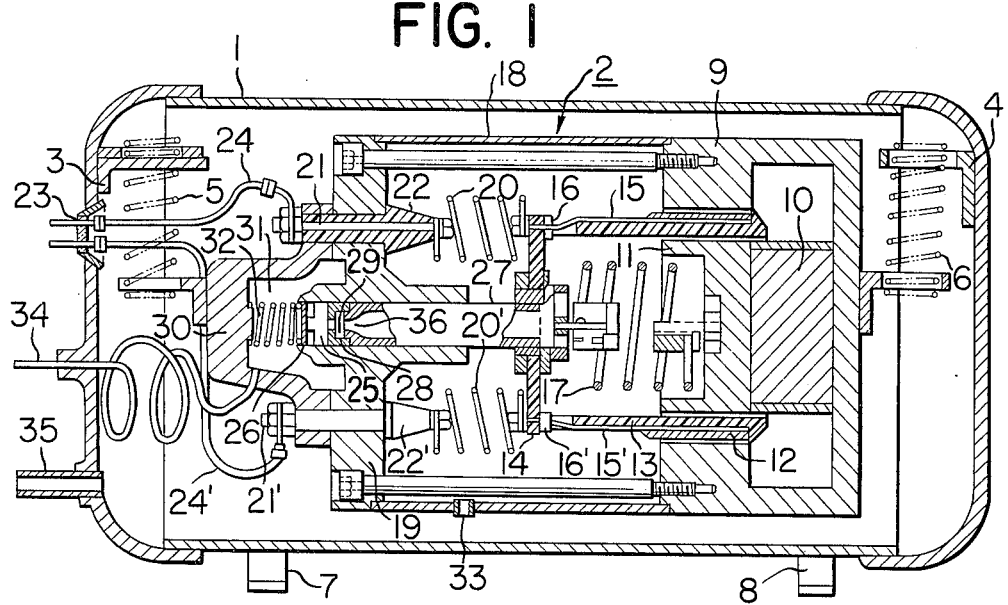
FIGS. 1 through 4 illustrate the construction and operation of an electric vibration type compressor embodying the present invention.

DETAILED DESCRIPTION OF THE EMBODIMENTS:

FIG. 1 shows the mechanical construction of an embodiment of on electric vibration type compressor of this invention. In the figure, the numeral 1 designates an enclosed cylindrical casing in which a compressor unit 2 is suspended from brackets 3 and 4 through coil springs 5 and 6, and which is equipped with mounting feet 7 and 8. The compressor unit 2 comprises a cylindrical yoke 9, a cylindrical permanent magnet 10 fitted to the inner bottom surface of the cylindrical yoke 9, a cup-shaped magnetic pole 11 fitted to the opposite end face (the left end face in FIG. 1) of the permanent magnet 10, a cylindrical drive coil 12 loosely fitted in the annular space between the outer surface of the magnetic pole 11 and the inner wall of the yoke 9, a disk-shaped support plate 14 supporting the drive coil 12 by means of a plurality of support members 13, conductor plates 15 and 15' serving as electric conductors connected to the drive coil 12, insulators 16 and 16' electrically insulating the support plate 14 from the conductor plates 15 and 15', a resonance coil spring 17 disposed in the space between the inside of the cup-shaped magnetic pole 11 and the support plate 14, a cylindrical spacer case 18 disposed concentrically with the yoke 9, a cylinder 19 forming the left end plate of the spacer case 18, lead springs 20 and 20', terminal screws 21 and 21', insulators 22 and 22' insulating the terminal screws 21 and 21' from the cylinder 19, lead wires 24 and 24' connecting the terminal screws 21 and 21' and the terminals 23 of the casing 1, a valve chamber 25 at an end (the left end in FIG. 1) of the cylinder 19, a valve element 26, a piston 27, a valve chamber 28 at an end (the left end in FIG. 1) of the piston 27, a valve element 29, a cap-shaped head cover 30 covering the valve chamber 25, a valve chamber 31 formed between the valve element 26 and the head cover 30, and a coil spring 32 disposed in the valve chest 31 biasing the valve element rightward to close the chamber 25. A refrigerant passage 33 is provided at the lower part of the spacer case 18 to connect the interior and exterior of the spacer case 18. A refrigerant outlet tube 34 is fitted to the head cover 30 to connect the valve chamber 31 of the head cover 30 and the outside of the compressor. A refrigerant inlet tube 35 also connects the interior of the casing 1 and the outside of the compressor.

A hole 36 is provided at the left end (as seen in FIG. 1) of the hollow piston 27, which connects the cavity of the piston 27 with the valve chamber 25 via the valve element 29.

The piston 27 reciprocates as the drive coil 12 vibrates in a manner as described more fully below, and refrigerant gas enters the casing 1 through the inlet tube 35 and flows into the spacer case 18 via the passage 33. The refrigerant is then discharged from the outlet tube 34 via the hollow part of the piston 27 and the valve chests 28, 25 and 31.

The mechanical vibration system consists essentially of the drive coil 12, piston 27 and members joining them, and the coil spring 17. The mechanical vibration system has a particular natural vibration period dependent on its structure and other conditions.

Figure 2:
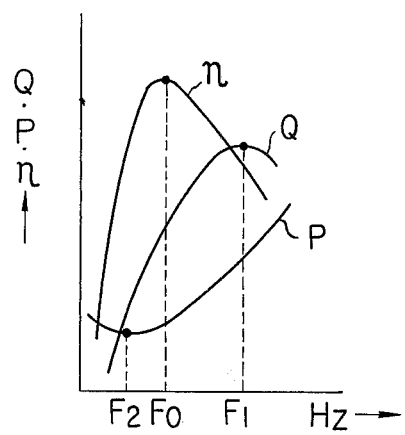

FIG. 2 shows the characteristics of an electric vibration type compressor of this type. In FIG. 2, the horizontal axis represents the vibration frequency of the compressor and the vertical axis the gas discharge rate Q, input power P and compression efficiency (Q/P) of the compressor. As clearly shown in the figure, the maximum compression efficiency $\eta$ is between the maximum discharge rate Q and the minimum input power P. The electrical power factor cos $\phi$ of the compressor is nearly unity and the vibration stroke is maximum at the maximum compression efficiency $\eta$. At this point, the frequency $F_0$ coincides with the electrical and mechanical resonant frequency of the electric vibration type compressor. $F_1$ represents the frequency at which the discharge rate Q becomes maximum, and $F_2$ the frequency at which the input power P becomes minimum, respectively.

Figure 3A:
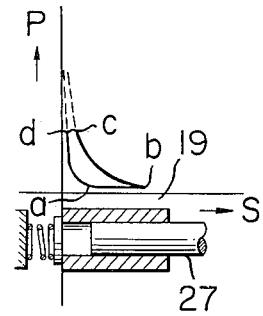
Figures 3B, 3C, 3D:
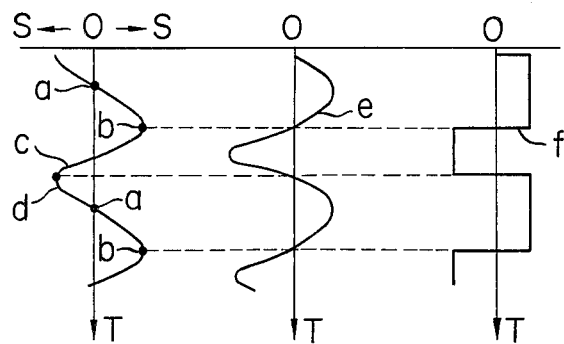
Figure 4A:
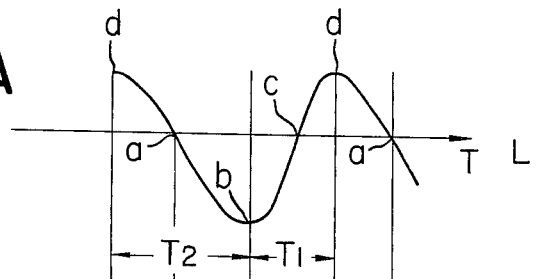
Figure 4B:
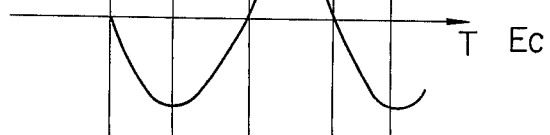
Figure 4C:
Figure 4D:
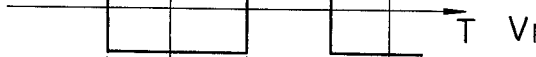
Figure 4E:
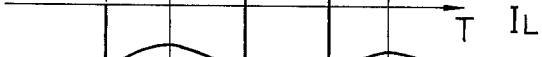
Figure 4F:
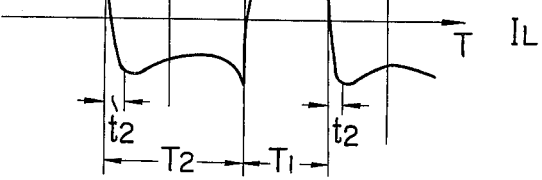

FIG. 3 explains the mechanical vibration of an electrical vibration type compressor constructed as mentioned above in steady operation. In FIG. 3 (A), as the piston 27 starts the suction stroke from its neutral point, reaches its top dead center point, and then begins the compression stroke, the S-P characteristic curve indicating the relationship between the displacement S and the pressure in the cylinder 19 forms a closed loop a, b, c, d, a, as shown in the figure. The vibration curve of a mechanical vibration system, therefore, is asymmetrical as seen in FIG. 3 (B), with both the displacement and period of the compression stroke being smaller than the suction stroke.

To drive such a vibration system which vibrates asymmetrically by a symmetrical current would inevitably lower its efficiency. Ideally, a mechanical vibration system should be driven by applying a waveform e in FIG. 3 (C), i.e., a waveform in phase with the vibration of the mechanical vibration system. The same effect will also be effected by a square wave f as shown in FIG. 3 (D).

With changes in the amplitude of the mechanical vibration in the compressor as shown in FIG. 3 (B), a counter electromotive force Ec as in FIG. 4 (B) is generated across the drive coil 12. This situation will be described in FIG. 4 in further detail. FIG. 4 (A) shows the amplitude waveform corresponding to FIG. 3 (B). The counter electromotive force assumes a waveform shown in FIG. 4 (B) with respect to the amplitude change, being zero at the top and bottom dead center points of the piston 27. Since there is a diference in terms of time between the compression stroke $T_1$ and the suction stroke $T_2$, the waveform of the counter electromotive force does not assume a perfect sinusoidal shape, but a somewhat distorted waveform. Changes with time lapse in the impedance Z of a compressor of the electrical vibration type assume a waveform obtained by superimposing the couter e.m.f. waveform as in FIG. 4 (B) on the basic waveform. The impedance Z is minimum at zero counter electromotive force and maximum at the maximum counter electromotive force, as shown in FIG. 4 (C).

If a square waveform voltage $V_1$ shown in FIG. 4 (D) in phase with the counter electromotive force Ec as in FIG. 4 (B) is applied to the compressor, a current $I_L$ flowing in the compressor becomes maximum at the lowest value of impedance and minimum at the highest value of impedance, as shown in FIG. 4 (E), being in phase with $V_1$.

The actual current, however, does not rise vertically, but assumes a curve which lags by a time $t_1$ during the compression stroke and by a time $t_2$ during the suction stroke in reaching its peak as shown in FIG. 4 (F) due to the inductance, including the drive power circuit, of the compressor.

It follows that the half wave waveform of the drive current $I_L$ of the compressor in steady operation has two peaks and a trough.

However, the initial drive current waveform of the compressor during starting is different from the drive current waveform in steady operation. The fact that the drive current waveform in steady operation assumes a waveform consisting of two peaks and a trough as mentioned above is attributable to the counter electromotive force caused by the vibration of the drive coil which vibrates in the magnetic field. In the absence of vibration of the drive coil, however, counter electromotive force is not generated during the initial stage of starting, with the consequence that the initial drive current is a value obtained by dividing the applied voltage by both the impedance of the drive coil itself and that of the power supply, assuming a waveform similar to the drive current $I_{LS}$ as shown in FIG. 5.

Figure 5:
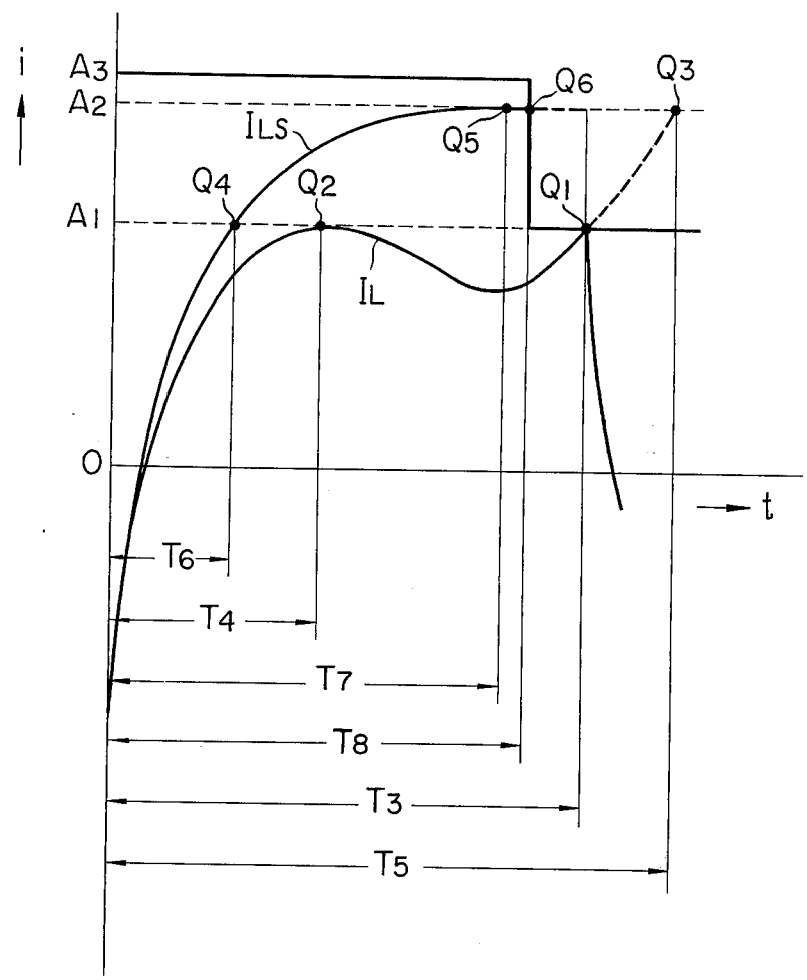
FIG. 5 illustrates the switching timing of a transistor type drive device with reference to each embodiment of FIGS. 6 through 8.

FIG. 5 explains the switching timing of transistors in the driving device in terms of the drive current $I_L$ of the compresssor in steady operation and the drive current $I_{LS}$ of the compressor at starting. The curves in the figure represent half the period of the current waveform, and the drive currents $I_L$ and $I_{LS}$ correspond to the collector current Ic of a switching transistor expressed in the above equations (1) and (2).

$I_L$ and $I_{LS}$ are current waveforms obtained when a square wave voltage having a half period of $T_3$ is applied to the compressor, with $I_L$ being the current obtained when the electric vibration type compressor in steady operation vibrates approximately at the resonance point, and $I_{LS}$ being the current at starting. In this case, the first and second peaks of the current $I_L$ are almost equal in height, and the operating frequency is almost equal to the frequency Fo, referring to FIG. 2. The magnitude of the comparison value, i.e., $hFE \cdot I_B$ in the above-mentioned equations (1) and (2) is represented by the level $A_1$ in FIG. 5. In other words, when $t = 0$, the square wave voltage applied to the compressor begins to rise, and the current $I_L$ also begins to flow. After the lapse of the time $T_3$, the magnitude of the current $I_L$ becomes equal to the level $A_1$ to form a point of intersection $Q_1$. As time further lapses and $I_L > A_1$, the transistors in the drive device instantaneously switch over, the polarity of the square wave voltage is also changed over the half period is completed. Since the time required for the current $I_L$ to become equal to the level $A_1$ and then to become larger than $A_1$ is extremely short, it may be said that almost all the switching is effected when $I_L = A_1$. Consequently, the half period T is the time for the current $I_L$ to becomes equal to $A_1$. Assuming the other half period is T', the frequency $f = 1/T + T'$, and the oscillation frequency of the drive device is determined by the above-mentioned conditions. Therefore, any frequency can be obtained by adjusting the level $A_1$. As seen in FIG. 5, however, the first peak is a value very close to the level $A_1$ in magnitude, so a point of intersection $Q_2$ is obtained by the level $A_1$ and the first peak of $I_L$, and the transistors in the drive devices are likely to start switching at $Q_2$. In this case, the half period T becomes equal to the time $T_4$, resulting in an extremely higher frequency which exceeds the resonance frequency range and so the electric vibratiion type compressor cannot be resonated.

The current waveform during the starting of the compressor, which is different from the current waveform $I_L$ in steady operation, is represented by the current $I_{LS}$ because of the vibrating conditions of the mechanical system. For this reason, in the condition of a fixed level $A_1$, a point of intersection is formed at $Q_4$ at which the switching is performed at at time $T_6$. The frequency in this state tends to be so high and far out of the resonance frequency range that the compressor cannot be started. In other words, abnormal oscillation occurs.

For all these factors, it haas been necessary for the stable operation of conventional drive devices of this type, particularly at starting, to perform switching at a time $T_7$ which is obtained by setting the magnitude of the comparison value A to a sufficiently large value, for instance, a level $A_2$, shifting the point of intersection to $Q_5$. Accordingly, the half period T which determines the oscillation frequency in steady operation is determined by the point of intersection $Q_3$, the period $T_5$ thus being obtained. As the result, the corresponding frequency becomes lower than the frequency $F_0$ at which the efficiency is maximum, as shown in FIG. 2. Therefore, it can be said that prior art drive devices have a drawback in that the capacity of the electric vibration type compressor cannot be fully utilized.

Figure 6:
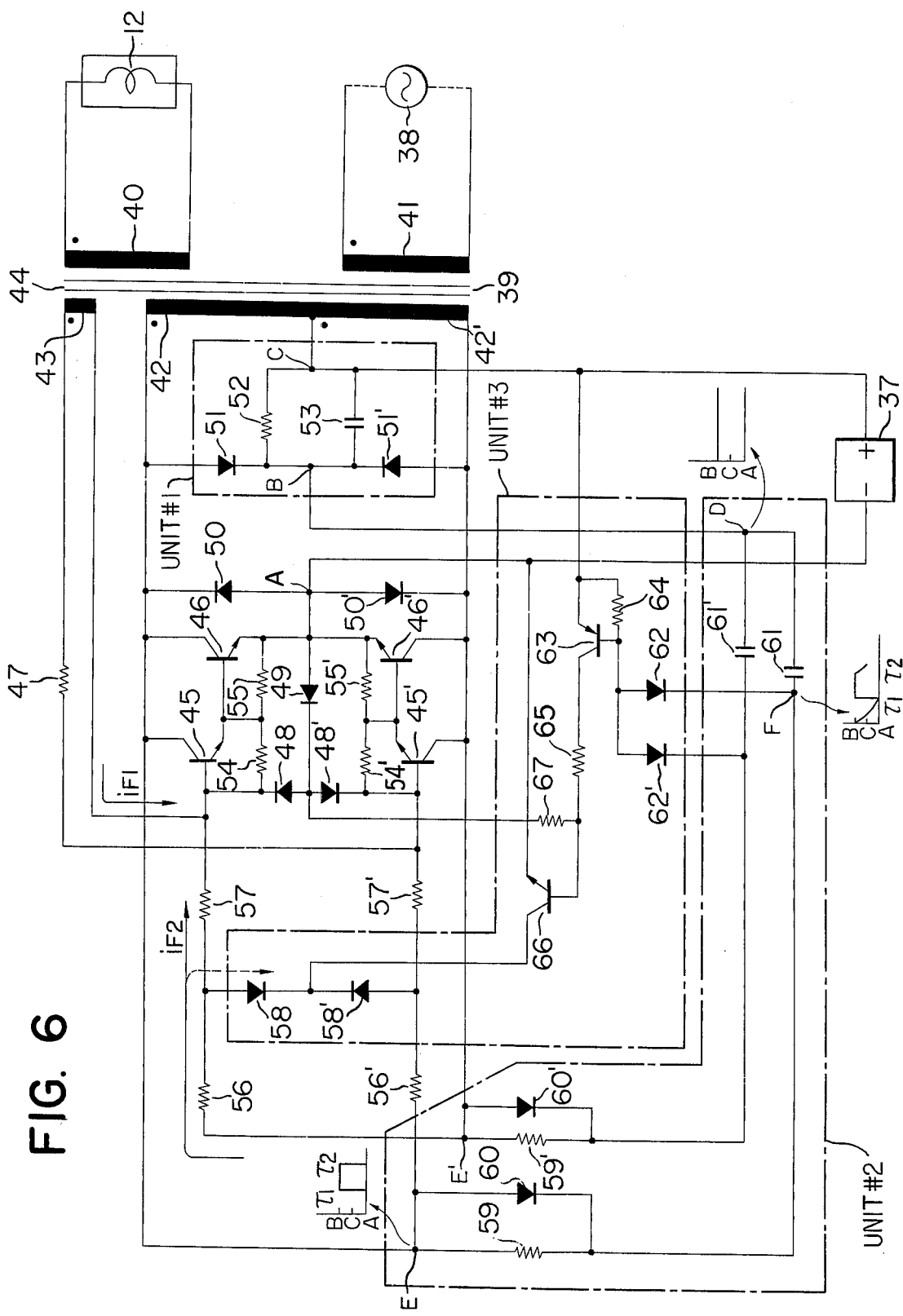
FIGS. 6 through 8 are circuit diagrams illustrating embodiments of the present invention.
Figure 7:
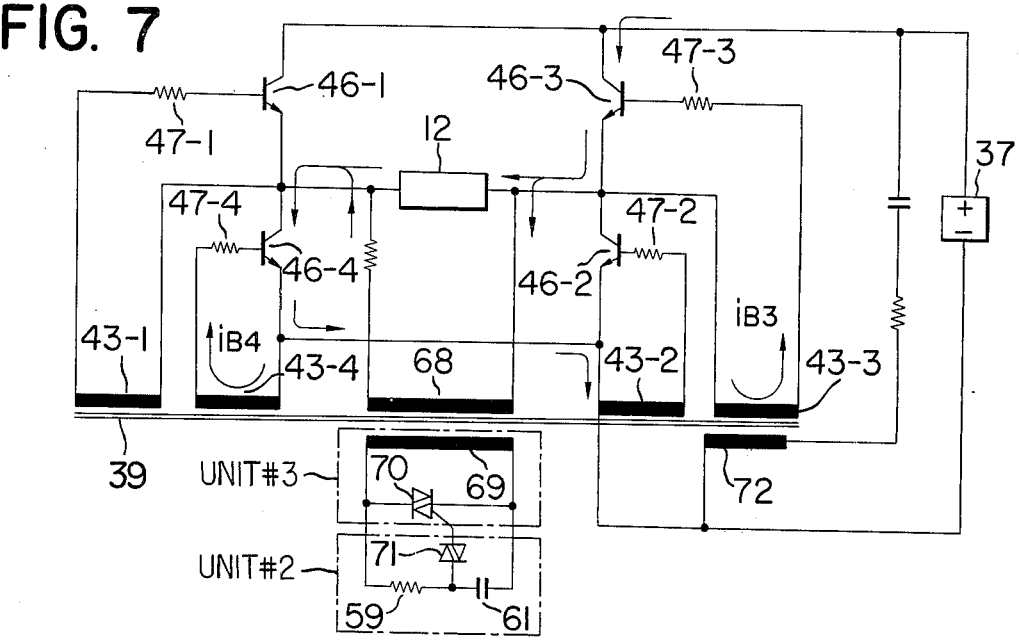
Figure 8:
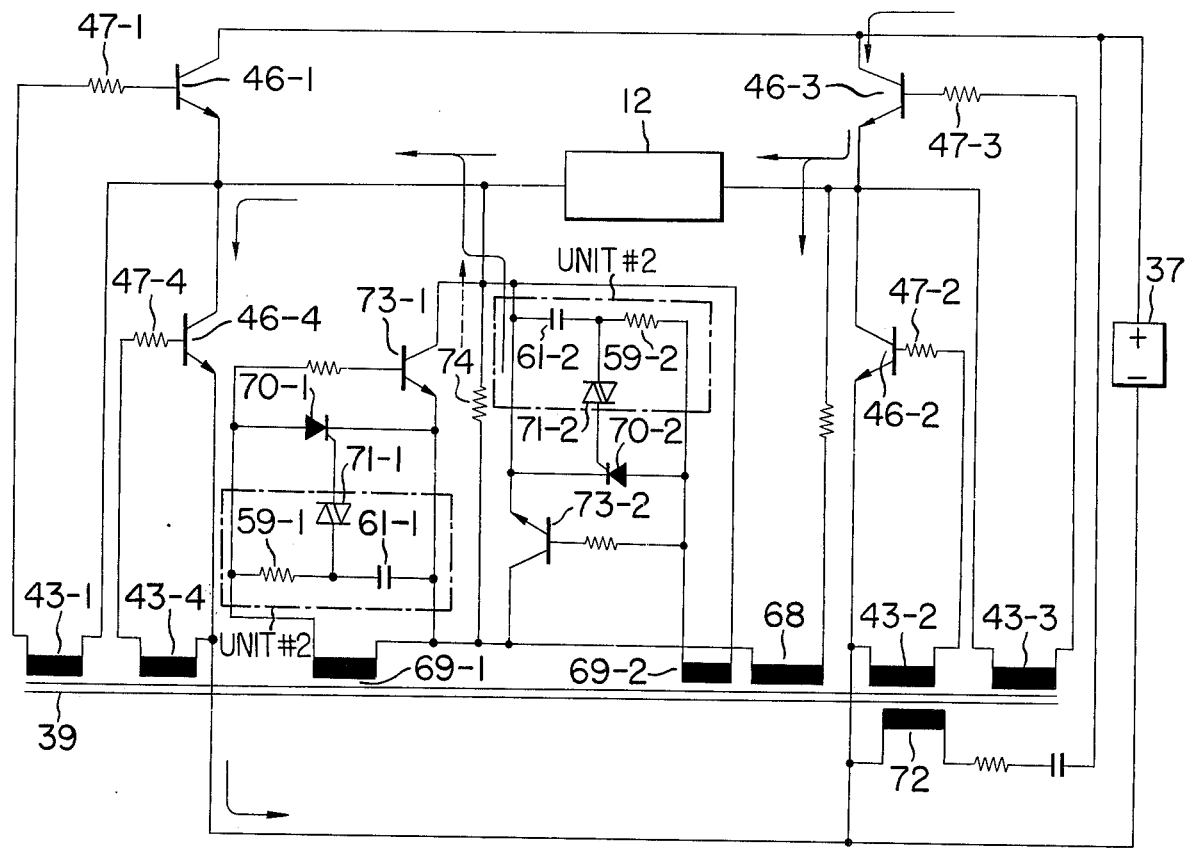

This invention is intended to improve the above-mentioned problems, and in particular the embodiments illustrated in FIGS. 6 through 8 are designed to solve the above-mentioned points in the manner as described below. The comparison value A for the period from the voltage rise of the square wave at $t = 0$ to $t = T_8$ in FIG. 5 is set to the level $A_3$, a value sufficiently larger than the starting current $I_{LS}$ or the first peak of the current $I_L$, and then after the lapse of $t = T_8$, shifted to the level $A_1$, a value smaller than $I_{LS}$. By performing this switchover, the frequency at steady operation can be determined by the time $T_3$ which is in turn determined by the point of intersection of the current $I_L$ and the level $A_1$, which ensures efficient operation of the electric vibration type compressor. In addition, since the level $A_3$ does not intersect the first peak of the current $I_L$, and during starting, the intersection of the current $I_{LS}$ and the comparison value A is shifted to $Q_6$ as the value A is shifted from $A_3$ to $A_1$, the oscillation frequency is determined by the time $T_8$. Now, assuming that the other half period is $T_8'$, the frequency $f = 1/T_8 + T_8$. If the time $T_8$ is set to a value close to the time $T_3$, poor starting will never occur. This will described in the following, referring to an embodiment shown in FIG. 6.

In FIG. 6, the numeral 12 refers to the drive coil of an electric vibration type compressor, 37 to a direct current power source (hereinafter referred to as a d-c power source), 38 to an alternating current power source (hereinafter referred to as an a-c power source), 39 to a transformer, 40 to a secondary winding of the transformer 39, 41 to a primary winding of the transformer 39 for the a-c input, 42 and 42' to primary windings of the transformer 39 for the d-c input, 43 to a feedback winding of the transformer 39, and 44 to an iron core of the transformer 39. 45, 46, 45' and 46' are respectively, Darlington connected transistors. 47 refers to a resistor to limit the magnitude of the feedback current fed back from the winding 43 to the transistors 45 and 45'. 48 and 48' are diodes comprising a bridge rectifier circuit, in conjunction with the base-emitter circuits of the transistors 45, 45', 46 and 46'. 49 is a voltage reduction diode whose forward resistance is utilized to drop the voltage. 50 and 50' are diodes used for returning the reactive power component of the circuit to the power source and protecting the circuit elements in the case of reversed connection of the d-c power source 37. 51 and 51' are diodes used, in conjunction with a capacitor 53 and a resistor 52, for supplying the pulse circuit mentioned below with a bias voltage twice as high as the input voltage. A circuit unit No. 1 consisting of the diodes 51 and 51', resistor 52, and capacitor 53 has a function to absorb the surge voltage and spike voltage caused by the leakage flux of the windings 42 and 42'. 54, 54', 55 and 55' are resistors which have an effect to provide appropriately reverse bias to the bases of the transistors which are in the off state among transistors 45, 45' 46 and 46' with a reverse bias voltage produced by the diodes 48 and 48', and the voltage reduction diode 49. 56, 56', 57 and 57' are resistors which supply the bases of the transistors 45 and 45' with positive feedback current from the collectors of the respectively opposite transistors. 58 and 58' are diodes which bypass the positive feedback current from the collectors to the bases, as mentioned above. 59 and 59' are resistors constituting a timing circuit mentioned below in conjunction with capacitors 61 and 61'. 60 and 60' are diodes which are used to charge the timing capacitors 61 and 61' with every inverting operation of the circuit. 62 and 62' are diodes which apply timing voltages, or the voltages across capacitors 61 and 61' to the base of the transistor 63. Resistor 64 is a temperature compensating resistor, and resistor 65 is a limiting resistor to prevent the collector current of the transistor 63 and the base current of the transistor 66 from increasing to an excessively high level. Resistor 67 is used for further improving the temperature compensating operation of the transistor 66 by applying the negative bias voltage from the diode (voltage reduction) 49 to the base of the transistor 66. The circuit unit No. 1 is a voltage doubler circuit, the circuit unit No. 2 is a timing signal generator circuit, and the circuit unit No. 3 is a control circuit bypassing positive feedback current.

In the figures, it is assumed that the a-c power source 38 is separated and the d-c power source 37 is connected to the circuit. As in the case of conventional drive circuits of this type, a pair of transistors 45 and 46 and another pair of transistor 45' and 46' are turned on and off alternately, thus producing a square wave voltage across the secondary winding 40. The square wave voltage in turn supplies the drive coil 12 of the compressor with a current having a waveform as shown in FIG. 5 as the current $I_{LS}$ (at starting) or the current $I_L$ (in steady operation). Now, assume that the pair of transistors 45 and 46 has just been turned to the on state. At this moment, a feedback winding current $i_{F1}$ from the feedback winding 43 and a positive feedback current $i_{F2}$ supplied through the resistors 56 and 57 by a voltage induced across the primary winding 42' are fed to the base of the transistor 45. However, the latter current $i_{F2}$ is bypassed via the diode 58 after the lapse of the time $T_8$ as shown in FIG. 5, which will be described later in further detail. The capacitor 53 shown in the circuit unit No. 1 in the figure is charged via the diode 51' by a voltage induced across the primary winding 42' (the maximum value of which equals the voltage V of the power source 37), with the charged voltage of the capacitor 53 being V volts. When the pair of transistors 45' and 46' is turned on, the capacitor 53 is of course charged by way of the diode 51, and therefore the voltage at the terminal point B of the capacitor 53 is maintained at 2V volts d-c, with respect to the zero potential at the point A. It is evident that the voltage at the point C is V volts d-c.

Furthermore, as it is evident from the fact that when the pair of transistors 45 and 46 is in the on state the transistor 46 is turned on, the potential at the terminal point E as shown in the lefthand central part of the figure is zero, the same as the potential at the above-mentioned point A while the potential at the terminal point E' shown in the lefthand central part of the figure is 2V volts, the sum of the voltage induced across the primary winding 42' and the voltage at the above-mentioned point C. Next, when the pair of transistors 45 and 46 is turned off and the pair of transistors 45' and 46' on, the potential at the point E becomes 2V volts while the potential at the point E' becomes zero. In other words the potentials at the points E and E', which are 180° out of phase, are switched between 0 and 2V volts alternately, as indicated in the figure.

In the inverter circuit shown in FIG. 6, the conditions for the pair of transistors 45 and 46 to be kept conducting and for the pair of transistors 45' and 46' to be kept non-conducting are chosen as follows and disigned in that manner. Assuming that the base current of a pair of Darlington connected transistors is $I_B$, the collector current $I_C$, and the current amplification factor $h_{FE}$, under the condition that $$h_{FE} \cdot I_B \geqq I_C \qquad (1)$$

the transistor pair is in the saturation region, and when it is shifted to the condition that $$h_{FE} \cdot I_B < I_C \qquad (2),$$

the transistor pair is shifted to the active region, resulting in a voltage drop between the collector and emitter.

It follows from this that when the pair of transistors 45 and 46 is in the saturation region, the voltage of the d-c power source 37 is applied to the primary winding 42, but when the pair of transistors 45 and 46 is about to be shifted to the active region, as mentioned above, the voltage across the above-mentioned primary winding 42 is decreased due to the voltage drop between the collector and emitter of the transistors. This in turn affects by way of the feedback winding 43 to quickly turn the pair of transistors 45 and 46 to the off state and the pair of transistors 45' and 46' to the on state.

As described above, the switching operation is performed between the pair of transistors 45 and 46 and the pair of transistors 45' and 46', and it can be considered that the collector current $I_C$ in equations (1) and (2) above corresponds to the current waveform $I_{LS}$ or $I_L$ as shown in FIG. 5, and similarly $h_{FE} \cdot I_B$ corresponds to the compared values indicated as levels $A_1$, $A_2$ and $A_3$.

As described in connection with FIG. 5, in the case of the embodiment of FIG. 6, the above-mentioned level A is designed to be maintained at $A_3$ during the period from $t = 0$, immediately after the transistors of the drive device have been switched over until the time $T_8$, and then to be decreased to the level $A_1$ after the lapse of the time $T_8$. Therefore, the illustrated currents $i_{F1}$ and $i_{F2}$ are fed to the base of the transistor 45 during the prescribed time immediately after the pair of transistors 45 and 46, for example, is turned on. In other words, the base current is first maintained at a high level (the level $A_3$) to satisfy equation (1) above, and then the level is lowered to $A_1$ to facilitate the pair of transistors 45 and 46 to be turned off by bypassing the above current $i_{F2}$ to a circuit consisting of the diode 58 and the transistor 66 after the lapse of the prescribed time, and supplying the base of the transistor 45 only with the current $i_{F1}$. Since the current flowing into the base of the transistor 45 is limited to the current $i_{F1}$ in this state, the pair of transistors 45 and 46 easily satisfies the condition of equation (2) above, with the consequence that the pair of transistors 45 and 46 is switched off at the point of intersection $Q_1$ as shown in FIG. 5.

The bypass control operation of the current $i_{F2}$ will be explained in the following. After the lapse of the prescribed time as controlled by the timing circuit of the circuit unit No. 2, which will be described later, the diode 62 or 62' is made conducting and the transistor 63 is turned on. Following the turning on of the transistor 63, the transistor 66 is turned on, and as mentioned above, the current $i_{F2}$ is bypassed by way of the diode 58. That is, the circuit unit No. 3 serves as a bypass control circuit of the positive feedback current $i_{F2}$.

The unit No. 2 is a timing signal generator circuit, and the following is a description of the timing operation.

At the instant the pair of transistors 45 and 46 is turned on, the potential at the point E in the lefthand central part of the figure is switched over from 2V volts to 0 volts as noted earlier. Changes with time in the potential at the point E are included in FIG. 6. Meanwhile, the potential at the illustrated point B is maintained at 2V volts d-c, and therefore, the potential at the point D shown in the lower central part of the figure is maintained at 2V volts at all times, as indicated in the figure. Consequently, from the instant when the pair of transistors 45 and 46 is turned on, or when the potential at the point E is switched over to 0 volts, the capacitor 61 begins to be discharged through the resistor 59, and the potential at the point F is gradually decreased from 2V volts. At this moment, the capacitor 61' is not discharged because the potential at the point E' as shown in the figure is kept at 2V volts.

Then, at the instant when the potential at the point F is about to drop to less than V volts, the diode 62 starts conducting, which turns on the transistor 63, and then the transistor 66.

Next, when the potential at the point E is switched again to 2V volts, the capacitor 61 discharged in the above-mentioned (operation) period is charged again up to 2V volts through the diode 60.

During the period from the instant when the transistors in the drive device are switched over until a predetermined time, for example, $T_8$ (in FIG. 5), a condition is provided to prevent the transistors in the drive device from switching by accident by setting the comparison value $h_{FE} \cdot I_B$ shown in the above equations (1) and (2) to the level $A_3$ by applying to the pair of transistors which are in the on state with the sum of the current $i_{F1}$ and the current $i_{F2}$. Also a condition is produced to facilitate the switching of the transistors in the drive device by setting the comparison value $h_{FE} \cdot I_B$ to the level $A_1$ by bypassing the current $i_{F2}$ by means of the unit No. 3 after the lapse of the time $T_8$.

FIG. 7 shows an embodiment of the present invention. In the figure, 46-1, 46-2, 46-3 and 46-4 are transistors which are bridge connected in such a manner that the pair of 46-1 and 46-2 and the pair of 46-3 and 46-4 are alternately turned on and off. 12 is a drive coil of the vibration type compressor, 37 is the d-c power supply, 43-1, 43-2, 43-3 and 43-4 are the base windings of each transistor, and 47-1, 47-2, 47-3 and 47-4 are the base resistors of each transistor. 59 and 61 correspond to the resistor and capacitor of the timing signal generator circuit in FIG. 6. 68 is an exciter coil, and 69 is an induction coil which is used for controlling the induced voltages across the above base windings 43-1 through 43-4, which will be described later. 70 is a bi-directional control element such as a triode AC semiconductor, 71 is a trigger diode or zener diode connected to the gate of the control element 70, and 72 is a starting exciter coil.

Now, assume that transistors 46-3 and 46-4 are turned to the on state by drive current from the d-c power source. In this case, the current flows in the circuit as shown by arrows in the figure, and the base currents $i_{B3}$ and $i_{B4}$ are supplied to transistors 46-3 and 46-4 to maintain the on state of the transistors 46-3 and 46-4. Meanwhile, a voltage is produced across the induction coil 69 by the exciter coil 68, and a relatively small current flows in the circuit of the induction coil 69 - resistor 59 - capacitor 61 - induction coil 69, with the consequence that an electric charge is gradually accumulated across the capacitor 61. The base currents $i_{B3}$ and $i_{B4}$ are kept high during this period. When the voltage across the capacitor 61 reaches the break-over voltage of the trigger diode or zener diode 71, the charge across the capacitor 61 is discharged through the gate of the bi-directional control element 70. At the same time, the bi-directional control element 70 is turned to the on state with the induced voltage across the induction coil 69 shortcircuited. Consequently, the induced voltages across the base windings 43-3 and 43-4 are decreased, with the base current of each transistor being decreased. Thus the base current assumes a staircase waveform as shown in FIG. 5, and after the lapse of time controlled by the unit No. 2, a condition is prepared for the transistors 46-3 and 46-4 to perform switching easily. Then, the transistors 46-3 and 46-4 are turned off under the condition expressed by the above equation (2) with the transistors 46-1 and 46-2 turned on. Similar operations are performed in the case where the transistors 46-1 and 46-2 are in the on state.

FIG. 8 shows another embodiment of the present invention. In the figure, 46-1, 46-2, 46-3 and 46-4 are transistors which are bridge connected in such a manner that the pair of 46-1 and 46-2 and the pair of 46-3 and 46-4 are alternately turned on and off. 12 is a drive coil of the vibration type compressor, 37 is the d-c power source. 43-1, 43-2, 43-3 and 43-4 are the base windings of each transistor, and 47-1, 47-2, 47-3 and 47-4 are the base resistors of each transistor. Resistors 59-1 and 59-2, and capacitors 61-1 and 61-2 correspond to the resistors and capacitors of the timing pulse generator circuit shown in FIG. 6. 68 is an exciter coil, and 69-1 and 69-2 are induction coils which are used for supplying voltages to the timing pulse generator circuits of the unit No. 2, and supplying base currents to the transistors 73-1 and 73-2. 70-1 and 70-2 are thyristors 71-1 and 71-2 are trigger diodes or zener diodes, 72 is a starting exciter coil, and 73-1 and 73-2 are transistors which are used for controlling the induced voltages across the base windings 43-1 through 43-4, which will be described later.

Assume that the transistors 46-3, 46-4 and 73-2 are turned on by the drive current from the d-c power source 37. At this time, a drive current is fed to the drive coil 12 of the compressor in the direction shown by arrows in the figure, and a circuit current flows through the transistor 46-3 - exciter coil 68 - transistor 73-2, as shown by solid lines. In the meantime, the current flowing through the induction coil 69-2 with the excitation of the exciter coil 68 supplies the transistor 73-2 with base current as well as gradually charging the capacitor 61-2 through the resistor 59-2. And at the same time, relatively high voltages are induced across the base windings 43-3 and 43-4, the transistors 46-3 and 46-4 thereby being supplied with high base currents. When the voltage across the capacitor 61-2 reaches the break-over voltage of the trigger or zener diode 71-2, the charge across the capacitor 61-2 is discharged through the gate of the tyristor 70-2, which is, at the same time, turned to the on state. Then, the transistor 73-2 is turned off because the base current is not fed to the transistor 73-2, and the circuit current begins to flow not in the transistor 73-2 but through the resistor 74, as shown by the broken line in the figure. Consequently, the current flowing in the exciter coil 68 is decreased ad the induced voltages across the base windings 43-3 and 43-4 are also decreased, each base current thus being decreased.

The base current assumes a staircase waveform, as shown in FIG. 5, and after the lapse of time controlled by the unit No. 2, a condition is prepared for the transistor 46-3 and 46-4 to be easily switched, and subsequently the transistors 46-3 and 46-4 are turned off under the condition expressed by equation (2) with the transistors 46-1 and 46-2 turned on. Similar operations are performed in the case where the transistors 46-1 and 46-2 are in the on state.

Figure 9:
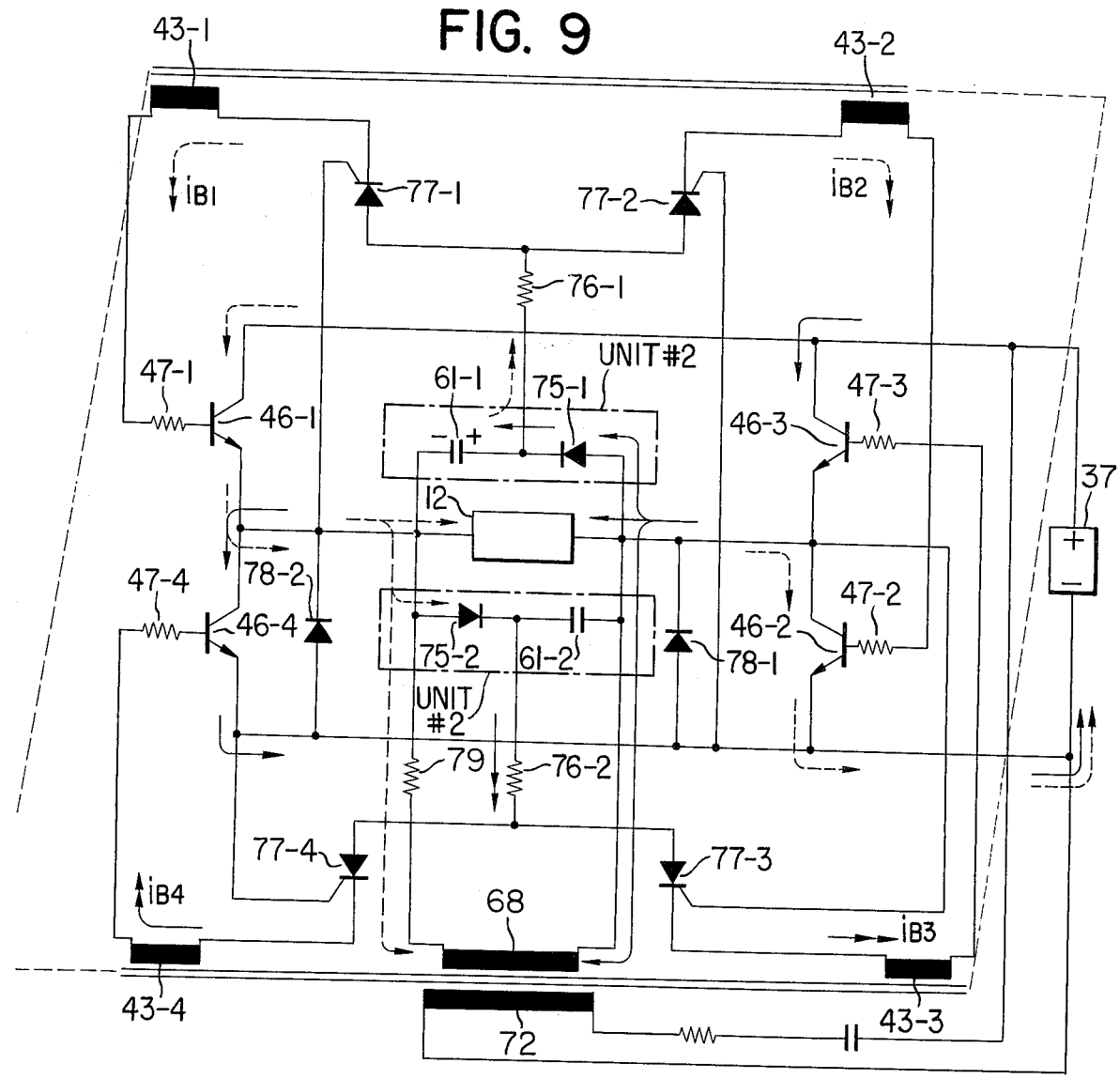
FIGS. 9, and 11 through 14 are circuit diagrams showing embodiments of the present invention, and and 10 is a diagram illustrating the switching timing embodiment each embodiment of FIGS. 9 and 11 through 14.

FIG. 9 shows another embodiment of the present invention where the discharged current of the capacitors is fed to the base current circuit for the initial predetermined period.

In the figure, 46-1, 46-2, 46-3 and 46-4 are transistors which are bridge connected in such a manner that the pair of transistors 46-1 and 46-2 and the pair of transistors 46-3 and 46-4 are alternately turned on and off.

12 is a drive coil of the vibration type compressor, and 37 is the d-c power source. 43-1, 43-2, 43-3 and 43-4 are the base windings for each transistor, and 68 is an exciter coil which is used for inducing voltages across the base windings 43-1 through 43-4. 72 is a starting exciter coil which is wound on the same iron core as the base windings 43-1, 43-2, 43-3 and 43-4 for each transistor and the exciter coil 68. 61-1 and 61-2 are capacitors for superposition of the base current, which are used for additionally supplying the base circuits of the above transistors 46-1, 46-2, 46-3 and 46-4 with discharge current determined by the time constant of the discharge path. 75-1, 75-2, 78-1 and 78-2 are diodes, and 77-1, 77-2, 77-3 and 77-4 are thyristors used for controlling the base currents of the above-mentioned transistors 46-1, 46-2, 46-3 and 46-4. 76-1 and 76-2 are resistors used for controlling the discharge currents of the capacitors 61-1 and 61-2. 47-1, 47-2, 47-3 and 47-4 are the base resistors of each transistor.

It is assumed that the transistors 46-3 and 46-4 are turned on by the drive current of the d-c power source 37. As the circuit current at that time is fed to the drive coil 12 of the vibration type compressor as shown by solid lines in the figure, electric charge is accumulated across the capacitor 61-1 of the timing pulse generator circuit of the unit No. 2. The polarity of the capacitor 61-1 at that time is as shown in the figure. Assume that the transistors 46-3 and 46-4 are subsequently turned off under the condition expressed by equation (2) with the transistors 46-1 and 46-2 turned on. The circuit current at that time flows as shown by broken lines in the figure, and a charge is built up across the capacitor 61-2, as in the case of the capacitor 61-1 when the transistors 46-3 and 46-4 are in the on state. The capacitor 61-1, on the other hand, begins to discharge simultaneously with the switching. The discharge current flows through the circuit of the control resistor 76-1, the thyristor 77-1, the base winding 43-1, the base resistor 47-1, the base and emitter of the transistor 46-1 and the capacitor 61-1, and through the circuit of the control resistor 76-1, the thyristor 77-2, the base winding 43-2, the base resistor 47-2, the base and emitter of the transistor 46-2, the diode 78-2 and the capacitor 61-1. This means that the above-mentioned discharge current is fed to the transistors 46-1 and 46-2 in addition to the original base current produced across the base windings 43-1 and 43-2. Consequently, relatively high base currents flow in the transistors 46-1 and 46-2 until the discharge of the capacitor 61-1 is completed.

Similar operations will be performed when the transistors 46-1 and 46-2 are turned off with the transistors 46-3 and 46-4 turned on.

Figure 10:
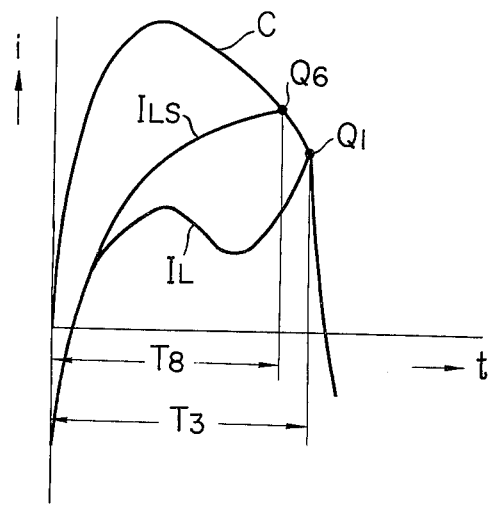

Switching conditions in this embodiment will be described in the following, referring to FIG. 10. In FIG. 10, the waveforms $I_L$ and $I_{LS}$ represent the drive currents in steady operation and at starting, respectively, and the waveform C represents the level in this embodiment corresponding to the switching level A in FIG. 5. The waveform C represents the abovementioned $h_{FE} \cdot I_B$ which is obtained by multiplying the sum of the base current from the base winding 43-1 and the discharge current of the capacitor 61-1 added to the base current by the current amplification factor of the transistor 46-1. As clear from the FIG. 10, therefore, the switching of the transistor 46-1 is performed at the point $Q_1$ in steady operation and at the point $Q_6$ at starting. It follows that the half period of the switching at starting becomes $T_8$, a value relatively close to the optimum switching half period, $T_3$. As the result, abnormal oscillation at starting is eliminated and stable and steady operation of the compressor is ensured.

Figure 11:
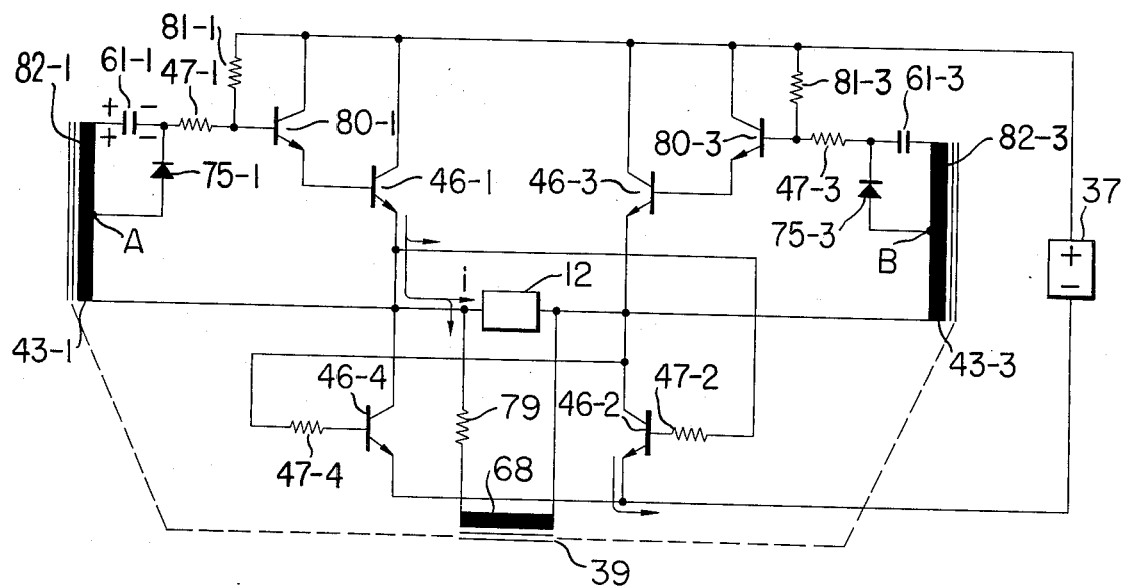

FIG. 11 shows another embodiment of the present invention which is based on the operating principle shown in FIG. 10. In the figure, numerals 46-1 through 46-4 refer to main transistors which are bridge connected. The main transistor 46-1 and 46-3 constitute a Darlington connection, together with transistors 80-1 and 80-3. On the transformer 39 are wound the exciter coil 68, and the base windings 43-1 and 43-3 which are connected to the main transistors 46-1 and 46-3, respectively. The base windings 43-1 and 43-3 have taps A and B, respectively. 81-1 and 81-3 are resistors which are used for turning on either of the main transistors 46-1 and 46-3 when the d-c power voltage is applied. 61-1 and 61-3 are capacitors used for controlling the switching of the main transistors 46-1 and 46-3, in conjunction with the diodes 75-1 and 75-3, respectively. 82-1 and 82-3 refer to the tapped windings on the capacitor side of the base windings 43-1 and 43-3. Other numerals correspond to those in FIGS. 6 through 9.

In the steady operation of the compressor, assuming that the main transistors 46-3 and 46-4 are about to be turned from the on state to the off state, a voltage is induced across the base winding 43-1 in such a direction as to turn on the main transistor 46-1 due to a decrease in the current which has been fed to the exciter coil 68 as well as the drive coil 12. At the same time, a voltage in such a direction as to turn off the main transistor 46-3 is induced across the base winding 43-3, whereby the capacitor 61-3 is charged in the indicated polarity through the diode 75-3. Conseqently, a charging current begins to be fed to the capacitor 61-1, which is charged in the polarity shown in the figure. Since this charging current corresponds to the base current of the transistor 80-1, the main transistor 46-1 is turned on, the base current thereby being fed to the main transistor 46-2, which is then turned on. As the result, a current flowing in the direction shown by solid lines in the figure is fed to the drive coil 12, and as the charge voltage across the above-mentioned capacitor 61-1 approaches the voltage induced across the capacitor-side winding 82-1, the charge current tends to decrease, and eventually the charging is completed when the charging current reaches the induced voltage.

As described later, when the main transistor 46-1 is switched from the on state to the off state, a voltage is induced across the base winding 43-3 in such a direction as to turn on the main transistor 46-3 due to a decrease in the current which has been fed to the exciter coil 68.

At that time the charge built up on the capacitor 61-1 supplies the capacitor-side winding 82-1 with discharge current through the diode 75-1, so a voltage, which is developed by superposing the voltage induced by the decreased voltage across the exciter coil 68 and the voltage induced by the discharged current in the capacitor-side winding 82-1 is induced across the base winding 43-3. The superposed voltage starts to charge the capacitor 61-3 in the opposite polarity in the indicated polarity. In other words, the capacitor 61-3 is charged in the opposite polarity to the indicated polarity through the addition of the voltage of the indicated polarity. Consequently, a high charging current is fed to the capacitor 61-3, and the main transistor 46-3 is turned on since the charging current correspond to the base current of the transistor 80-3. Once the main transistor 46-3 is turned on, the main transistor 46-4 is successively turned on, and a drive current i flows in the opposite direction to that in the case of the main transistors 46-1 and 46-2. It is needless to say that the switching operation in the case where the main transistors 46-3 and 46-4 are in the on state is performed in the same manner as in the case where the main transistors 46-1 and 46-2 are in the on state. Thus, an alternating current is fed to the drive coil 12 to drive the compressor.

In the case of this embodiment, the same effect as in the case shown in FIG. 9 can be achieved by the mere fact that the waveform C corresponds to the abovementioned $h_{FE} \cdot I_B$ which is obtained by multiplying the charging current of the capacitor 61-1 by the current amplification factor of the transistor 80-1 and the main transistor 46-1.

Figure 12:
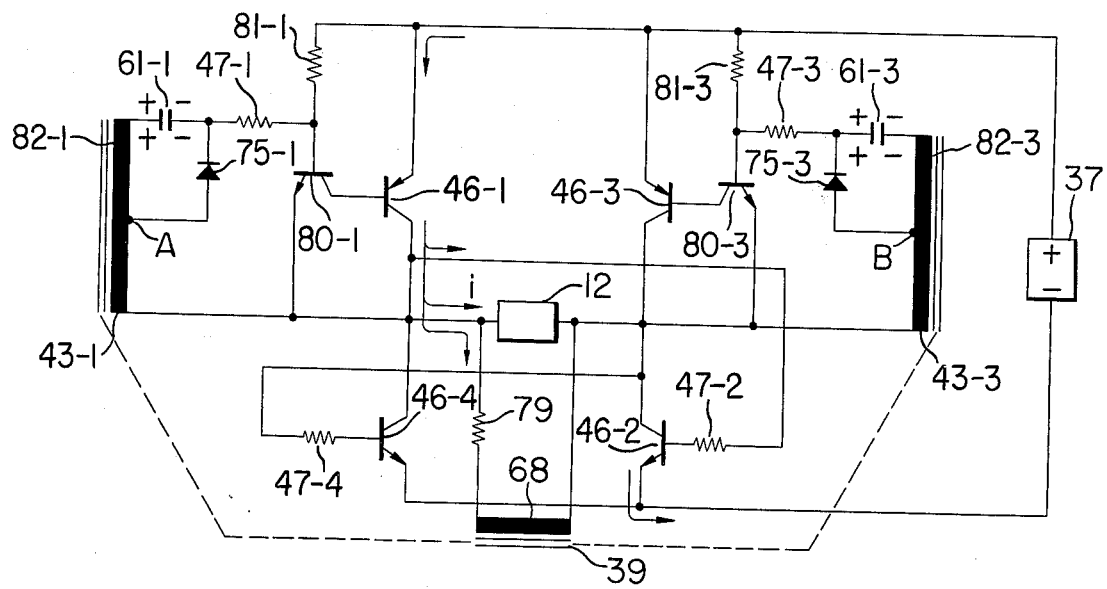

FIG. 12 shows an embodiment of the present invention, similar to that shown in FIG. 11. This embodiment employs PNP transistors for the main transistors 46-1 and 46-3 while the embodiment of FIG. 11 uses NPN transistors for them. As the result, the main transistor 46-1 and the transistor 80-1, and the main transistor 46-3 and the transistor 80-3 are Darlington connected, respectively, as shown in the figure, but the switching operation of the main transistors 46-1 and 46-3 is, needless to say, the same as that in the embodiments shown in FIGS. 9 and 11.

Figure 13:
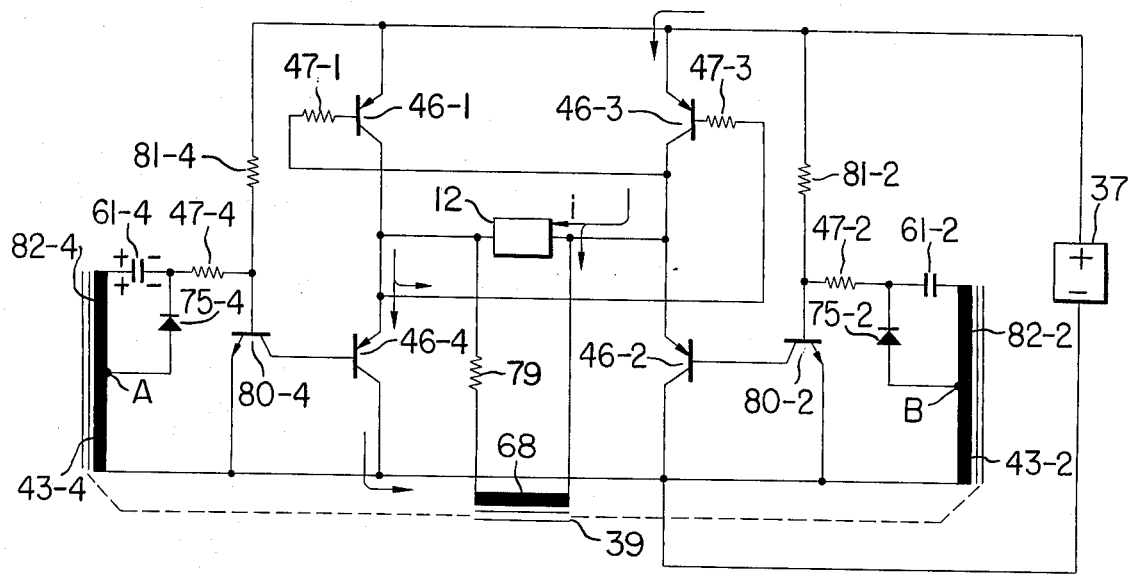

FIG. 13 shows another embodiment of the present invention, similar to that shown in FIG. 11. In this embodiment, PNP transistors are used for all the four main transistors 46-1 through 46-4, and switching operation is performed on the side of the main transistors 46-2 and 46-4 while, in the embodiments shown in FIGS. 11 and 12, main switching operation is performed on the side of the main transistors 46-1 and 46-3. It goes without saying that the same switching operation is performed in this embodiment as in the embodiments in FIGS. 11 and 12.

Figure 14:
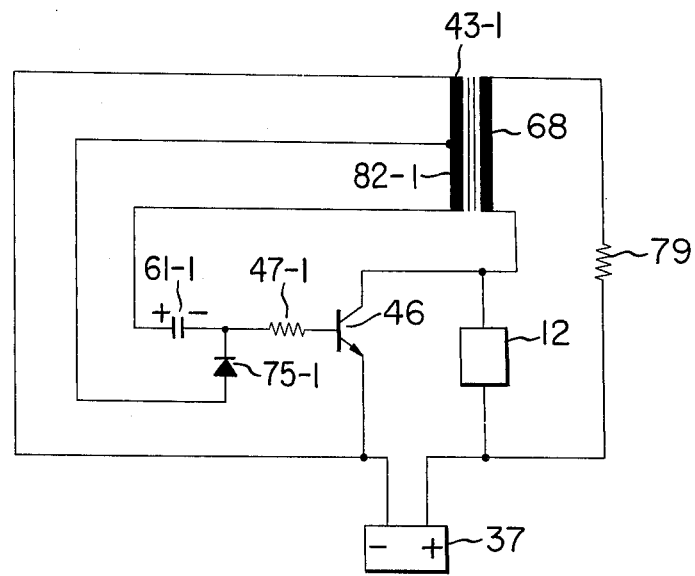

FIG. 14 shows another embodiment of the present invention, similar to that shown in FIG. 11. In this embodiment where only one transistor is used, a drive current is fed to the drive coil 12 during the half period in which the transistor 46 is turned on. In that half period, the capacitor 61-1 is charged through the base-emitter circuit of the transistor 46. The charging current remains large during the initial period of switching of the transistor 46, and then gradually decreases as the charging of the capacitor 61-1 proceeds. The charge accumulated across the capacitor 61-1 is discharged through the diode 75-1 during the half period in which the transistor 46 is turned off to prepare for the charging in the next half period. In this embodiment, the same effect as in the embodiments shown in FIGS. 11, 12 and 13 is produced.

Figure 15:
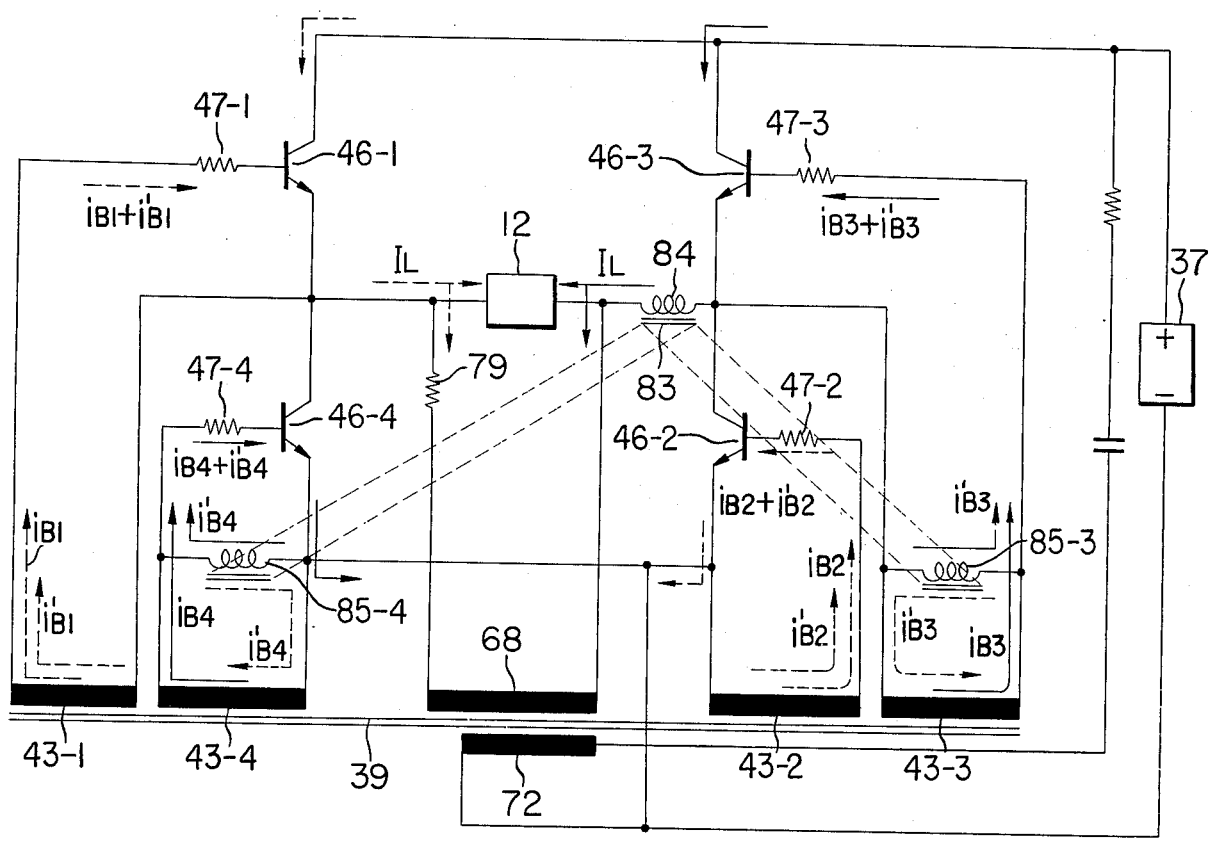
FIG. 15 is a circuit diagram illustrating an embodiment of the present invention, and FIGS. 16A dn 16B are diagrams showing the operation of the embodiemtn of FIG. 15.

FIG. 15 shows still another embodiment of the present invention. In FIG. 15, 83 refers to a current transformer having a primary winding 84 series connected to the drive coil 12 of the compressor, and secondary windings 85-3 and 85-4 parallel connected to the base windings 43-3 and 43-4 of the transistors 46-3 and 46-4.

Assuming that the transistore 46-3 and 46-4 are turned on, the circuit current flows as shown by solid lines in the figure. At that time, (1) the current $i_{B3}$ and $i_{B4}$ (hereinafter referred to as the first base current) produced by a voltage which is induced across the base windings 43-3 and 43-4 through the transformer 39 by a current from the exciter coil 68; and (2) the current $i'_{B3}$ and $i'_{B4}$ (hereinafter referred to as the second base current) fed to the secondary windings 85-3 and 85-4 through the current transformer 83 by the current (drive current $I_L$) of the primary winding 84 are caused to be fed in the direction shown by solid lines in the figure.

In other words, the base currents which are the sum of the first and second base currents, respectively ($i_{B3} + i'_{B3}$ ; $i_{B4} + i'_{B4}$) are fed to the transistors 46-3 and 46-4.

Assuming that the transistors 46-3 and 46-4 are shifted from the saturation region to the active region in accordance with equation (2), the transistors 46-1 and 46-2 are tuned on, with the circuit current flowing as shown by broken lines in the figure. Consequently, the currents $i'_{B3}$ and $i'_{B4}$ begin to be fed to the secondary windings 85-3 and 85-4 in the direction shown by broken lines in the figure, and the currents $i'_{B1}$ and $i'_{B2}$ of a magnitude substantially equal to the second control current are added to each base of the transistors 46-1 and 46-2, in the direction shown by broken lines in the figure, by way of the base windings 43-3 and 43-4, the transformer 39, and the base windings 43-1 and 43-2. Since the currents $i_{B1}$ and $i_{B2}$ (which correspond to the said first base current), in addition to the currents $i'_{B1}$ and $i'_{B2}$, are also fed to each base of the transistors 46-1 and 46-2 through the exciter coil 68, the transformer 39 and the base windings 43-1 and 43-2, the currents fed to each base amount to $i_{B1} + i'_{B1}$ and $i_{B2} + i'_{B2}$, respectively. When the transistors 46-1 and 46-2 are shifted from the saturation region to the active region, the transistors 46-1 and 46-2 are turned off, with the transistors 46-3 and 46-4 turned on. In this way, the pair of transistors 46-1 and 46-2 and the pair of transistors 46-3 and 46-4 repeat on-off operations alternately, whereby an alternating current is fed to the drive coil 12 to drive the compressor.

Figure 16A:
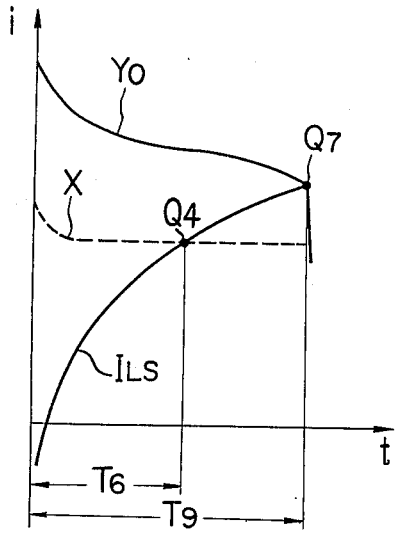
Figure 16B:
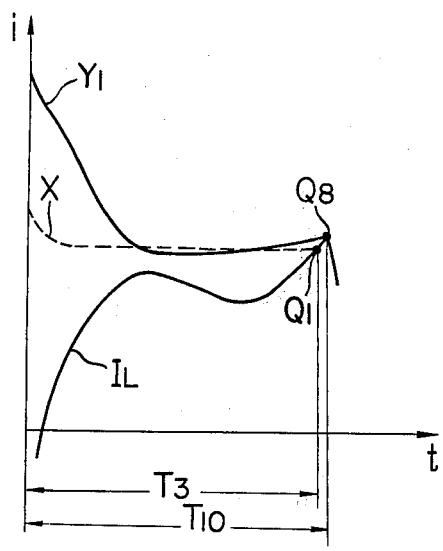

FIGS. 16 (A) and (B) illustrate each switching state of the embodiment shown in FIG. 15 for starting and in steady operaton, respectively.

In FIG. 16 (A), $I_{LS}$ represents the drive current at starting of the compressor, which corresponds to $I_C$ in equations (1) and (2). X represents the product of the base currents $i_{B1}$ through $i_{B4}$ (the first base currents) fed to the transistors 46-1 through 46-4 by way of the exciting winding 68, the transformer 39 and the base windings 43-1 through 43-4 multiplied by the current amplification factor $h_{FE}$. $Y_0$ represents the product of the base currents (the first base currents + the second base currents) fed to the transistors 46-1 through 46-4 multiplied by the current amplification factor $h_{FE}$, which corresponds to $h_{FE}I_B$ in the equations (1) and (2). The second base current is generated by the current fed to the primary winding 84 (i.e., the drive current $I_{LS}$), and theoretically has a waveform obtained by differentiating the drive current $I_{LS}$. This waveform is actually affected by the inductance of, for example, the secondary windings 85-3 and 85-4, etc. Consequently, $Y_0$ mentioned above generally assumes a waveform as shown in FIG. 16 (A).

Since the switching of the transistors 46-1 through 46-4 is performed at the point $Q_7$ shown in the figure in the case of the embodiment of FIg. 15, the switching half period is $T_9$. This half period $T_9$ is close to the optimum half period $T_3$ in steady operation, which will be described later, resulting in elimination of abnormal oscillation at starting. The point $Q_4$ (in FIG. 16 (A) ) represents the point at which the switching at starting of a drive device (of conventional known type) from which the current transformer 83, the primary winding 84 and the secondary windings 85-3 and 85-4 in FIG. 15 is performed. In this case, the switching half period at starting is $T_6$, the same as shown in FIG. 5. As the half period $T_6$ is considerably shorter than the above-mentioned optimum half period, unstable oscillation, of abnormal oscillation occurs.

In FIG. 16 (B), $I_L$ represents the drive current in steady operation, X represents the same as X illustrated in FIG. 16 (A), and $Y_1$ represents the waveform produced by the base current (the first base current + the second base current) of the transistors 46-1 through 46-4 in steady operation. $Y_1$ mentioned above assumes the waveform shown in FIG. 16 (B) since the drive current $I_L$ assumes the waveform shown in the figure in steady operation and is affected by the inductance of the secondary windings 85-3 and 85-4. It is needless to say that the first base current, which is a component of $Y_1$, is the same as X (FIG. 16 (A)) at starting, independent of the drive current $I_L$. Consequently, in the case of the embodiment shown in FIG. 15, the switching half period becomes $T_{10}$ since the switching of the transistors is performed at the point $Q_8$. The half period $T_{10}$ can take a value very close to the optimum half period $T_3$ (FIG. 5) which is determined for the most common type of drive device.

Figure 17:
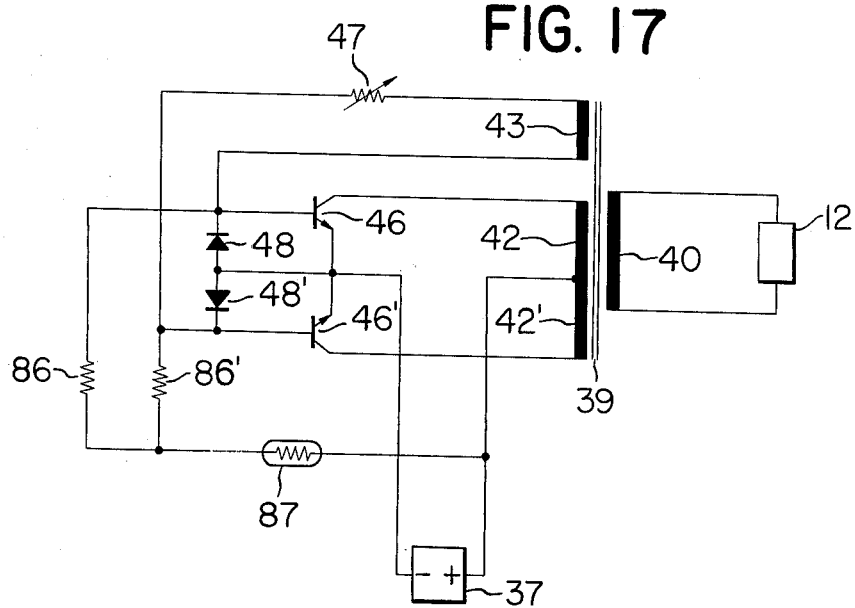
FIGS. 17 through 23 are circuit diagrams illustrating embodiments of the present invention.

FIG. 17 shows an embodiment of the present invention. In the figure, 46 and 46' are switching transistors, 37 is a d-c power source, 39 is a transformer, 42 and 42' are primary windings, 43 a base winding, 40 a secondary winding, 12 the drive coil of the compressor 86 and 86' balancing resistors, 87 a positive characteristic thermistor, and 47 a variable resistor which is used for controlling the base currents of the switching transistors 46 and 46', 48 and 48' are diodes.

At starting, the base currents of the switching transistors 46 and 46' are equally supplied by means of the positive characteristic thermistor 87 and the balancing resistors 86 and 86', a slight imbalance of the switching transistors causes either of the transistors to be turned on first, and then these transistors gradually enter into steady operation. The resistance of the positive characteristic thermistor 87 takes a small value for a while after starting, so a large current is fed from the positive characteristic thermistor 87 to the bases of the switching transistors, in addition to the feedback current from the base winding 43.

In steady operation, on the other hand, assuming that the switching transistor 46 is in the on state and 46' is in the off state, a base current, which is the sum of the current from the feedback winding 43 and the current flowing through the positive characteristic thermistor 87 and the balancing resistor 86, is fed to the base of the transistor 46. However, since the resistance of the positive characteristic thermistor 87 becomes larger than the resistance at starting, the current flowing through the positive characteristic thermistor 87 and the balancing resistor 86 is smaller than that at starting. In other words, the normal switching operation is maintained both at starting and in steady operation, satisfying the switching conditions expressed in equations (1) and (2) by setting $h_{FE}FE \cdot I_B$ to a large value at starting and to a smaller value after the device has entered into steady operation.

When the transistor 46 is in the off state and the transistor 46' in the on state, the current fed through the balancing resistor 86' is exactly the same as the current fed through the balancing resistor 86 when the transistor 46 is in the on state, the transistor 46' thus being switched properly.

Figure 18:
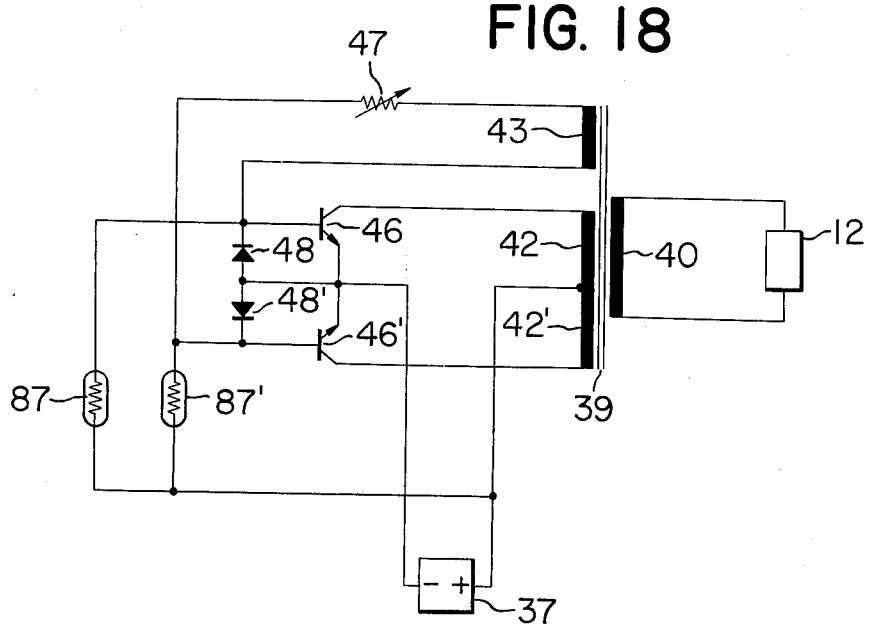

In the embodiment shown in FIG. 18, numerals 46, 46', 37, 39, 42, 42', 43, 40, 36, 47, 48, 48' correspond to like numerals in FIG. 17, with 87 and 87' being positive characteristic thermistors provided in this embodiment.

At starting, the base currents of the switching transistors 46 and 46' are equally supplied by the positive characteristic thermistors 87 and 87', and a slight imbalance in the switching transistors cause either of them to be turned on, leading to the subsequent steady operation. Since the resistance of the positive characteristic thermistor connected to the switching transistor which is in the on state takes a small value for a predetermined period after starting, a large current is fed to the base of the said switching transistor.

In steady operation, assuming that the switching transistor 46 is in the on state and 46' in the off state, a base current which is the sum of the current from the feedback winding 43 and the current flowing in the positive characteristic thermistor 87 is fed to the base of the transistor 46. However, the current flowing in the positive characteristic thermistor 87 is smaller than that at starting because the resistance of the positive characteristic thermistor 87 takes a larger value than the resistance at starting. When the transistor 46 is in the off state and the transistor 46' is in the on state, the current fed through the positive characteristic thermistor 87' is exactly the same as the current fed through the positive characteristic thermistor 87 when the transistor 46 is in the on state.

Figure 19:
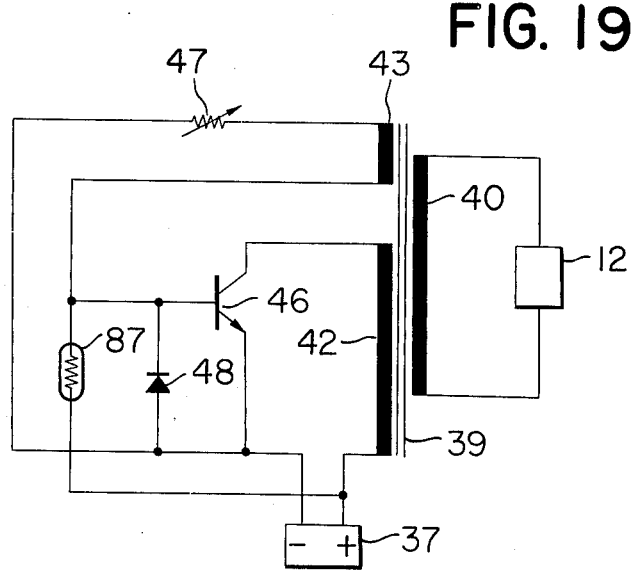

FIG. 19 shows an embodiment of the present invention in which a single transistor is employed. Numerals in the figure correspond to like numerals in FIG. 18. In this embodiment, the same effect as in the case of FIG. 18 is achieved except that a drive current is fed to a drive coil 12 during the half period in which the transistor 46 is turned on.

Figure 20:
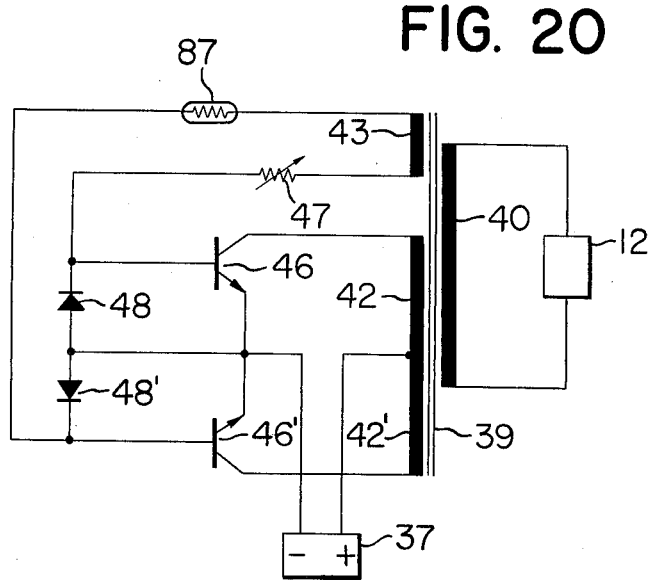
Figure 21:
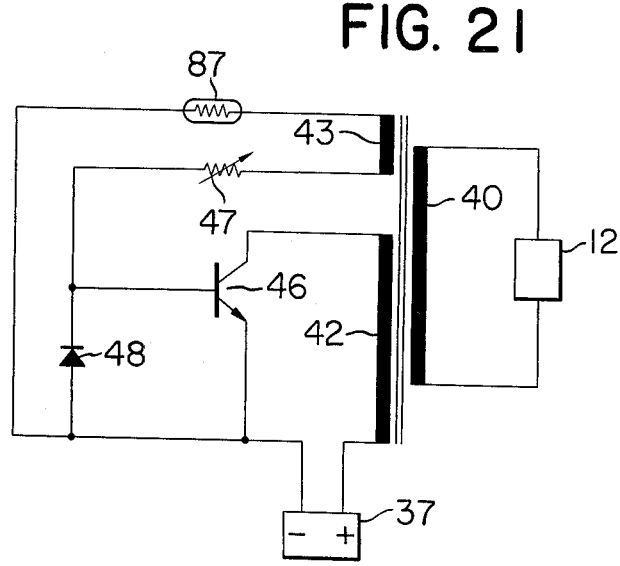

FIGS. 20 and 21 show an embodiment of the present invention in which a positive characteristic thermistor 87 is inserted in the circuit of a base winding 43. There is a difference between the circuit configuration of the two figures in that the circuit of FIG. 20 employs two transistors while that of FIG. 21 uses a transistor. It will be appreciated, of course, that the embodiment shown in both figures has the same effect as those embodiments in FIGS. 17 through 19 since, in both cases a large current flows from the base winding 43 to the transistor 46 (or 46') at starting, and the resistance of the positive charateristic thermistor 87 becomes larger when steady operation starts, resulting in reduced base current.

Figure 22:
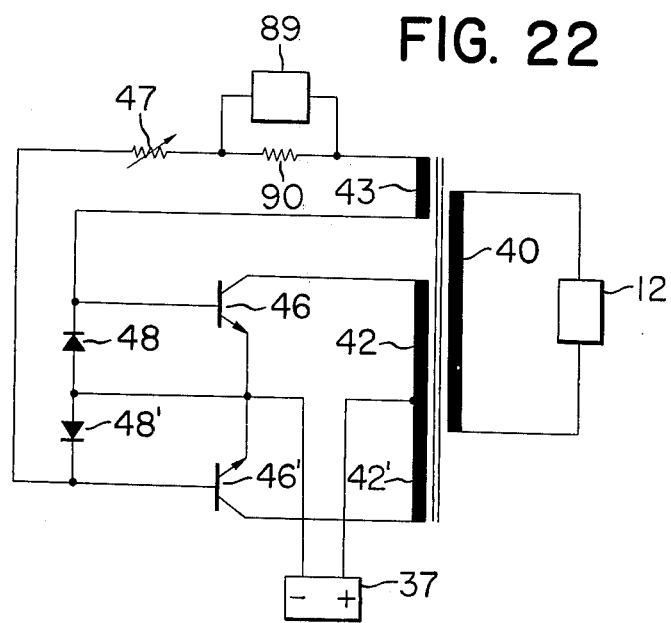
Figure 23:
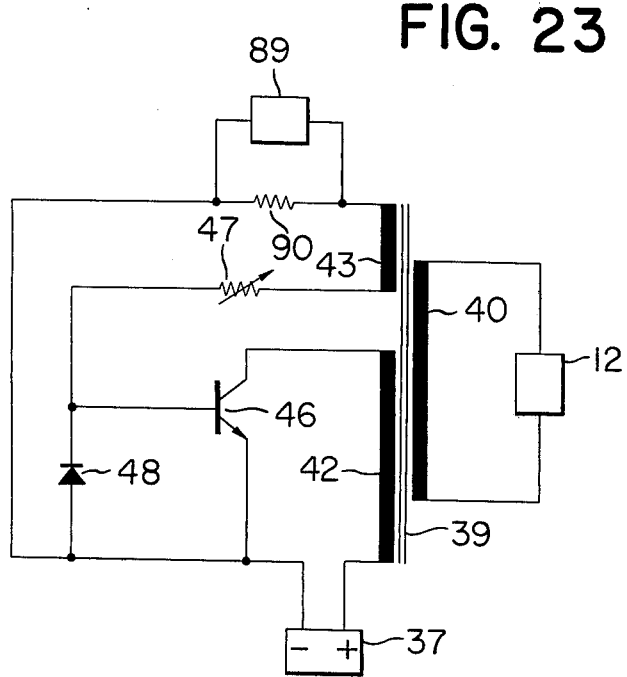

FIGS. 22 and 23 show modifications of the above-mentioned embodiment shown in FIGS. 20 and 21. In these embodiments, a switching circuit 89 and a resistor 90 are inserted in place of the positive characteristic thermistor 87 shown in FIGS. 20 and 21. In these embodiments, the switching circuit 89 is turned on at starting, and a large current flows fromm the base winding 43 to the base of the transistor 46 (or 46'). Then, after the circuit enters into steady operation, the switching circuit 89 is turned to the off state by timing means, the base current being reduced to a small value. Thus the same effect as in FIGS. 17 through 21 is achieved in these embodiments.

Figure 24:
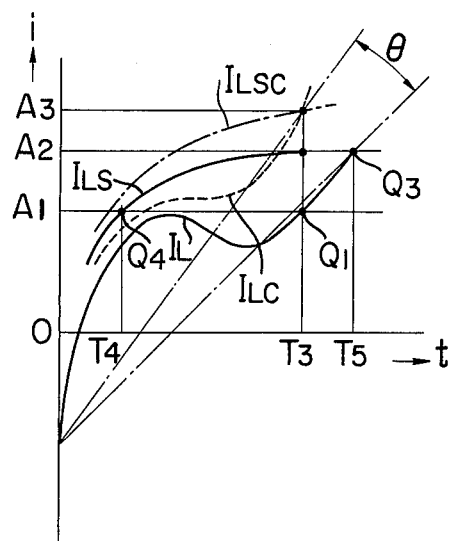
Figure 25:
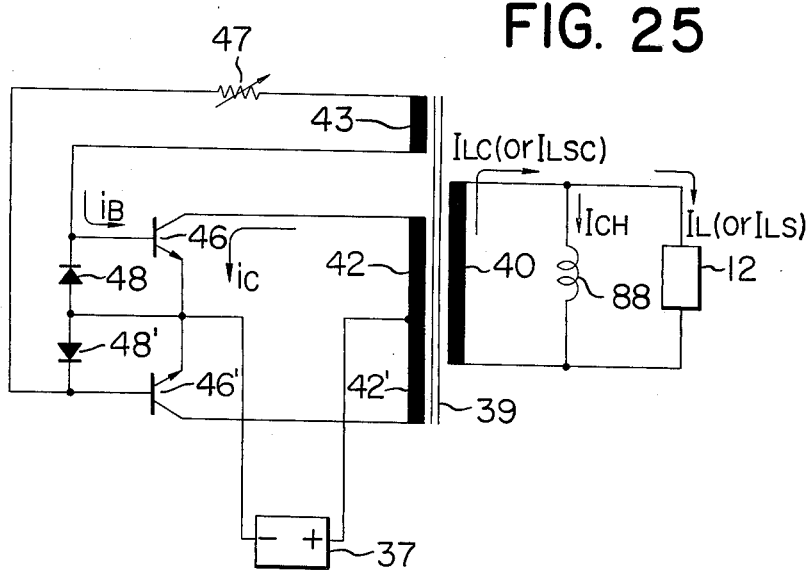
FIGS. 25 and 27 are circuit diagrams showing embodiments of the present invention.

FIG. 24 illustrates the switching timing of the transistors of the drive device in embodiment shown in FIG. 25. The waveforms in the figure represent the half periods of the current waveforms, corresponding to FIG. 5. In the figure, $I_{LC}$ and $I_{LSC}$ refer to the drive currents compensated by the embodiment in FIG. 25, with $I_{LC}$ being the current obtained by compensating the drive current $I_L$ in steady operation and $I_{LSC}$ being the current obtained by compensating the drive current $I_{LS}$ at starting.

In the embodiment shown in FIG. 25, currents $I_{LC}$ and $I_{LSC}$ are obtained by adding the compensating current to the drive currents $I_L$ and $I_{LS}$ shown in FIG. 24 and rotating the curves of the drive current $I_L$ and $I_{LS}$ by an angle $\theta$, so that switching operations both at starting and in steady operation can be performed at a favorable switching time $T_3$. Although the drive currents $I_L$ and $I_{LS}$ are fed to the drive coil of the compressor as in normal cases, the switching timing of the transistors of the drive device is determined by the current $I_{LC}$ or $I_{LSC}$ and the level $A_3$.

FIG. 25 shows an embodiment of the present invention designed to achieve the same operation as in FIG. 24. 46 and 46' refer to switching transistors, 37 to a d-c power source, 39 to a transformer, 42 and 42' to primary windings, 43 to a feedback winding, 40 to a secondary winding, 12 to the drive coil of the compressor, and 88 to an inductance element provided in this embodiment.

It is needless to say that the transistors 46 and 46' are alternately turned on and off to apply a square wave voltage to the drive coil 12 of the compressor.

When a square wave voltage shown in FIG. 26 (A) is applied, a current of the waveform as shown in FIG. 26 (B) flows in the drive coil 12 of the compressor, as described in connection with FIG. 4. On the other hand, a compensating current $I_{CH}$ shown in FIG. 26 (C) flows in the inductance element 88. As the result, the entire current flowing through the secondary winding 40 of the transformer of the compressor, that is, the compensated drive current $I_{LC}$ can be of a waveform as shown in FIG. 26 (D).

The waveform shown in FIG. 26 (D) corresponds to the compensated drive current $I_{LC}$ shown in FIG. 24. Thus, the current $I_{LC}$ and the current $I_{LSC}$ can be set so that both currents are brought close to each other at the time $T_3$, as shown in FIG. 24. In other words, this embodiment makes it possible to cause the current at starting and the current in steady operation to intersect in the neighborhood of the time $T_3$ while a current, which is virtually the same as the drive current $I_{LS}$ or $I_L$, is fed to the drive coil 12 of the compressor. Consequently, mismatching between the switching periods at starting and in steady operation can be prevented and stable driving can be achieved by causing the transistors of the drive device to switch at the time $T_3$.

Figure 27:
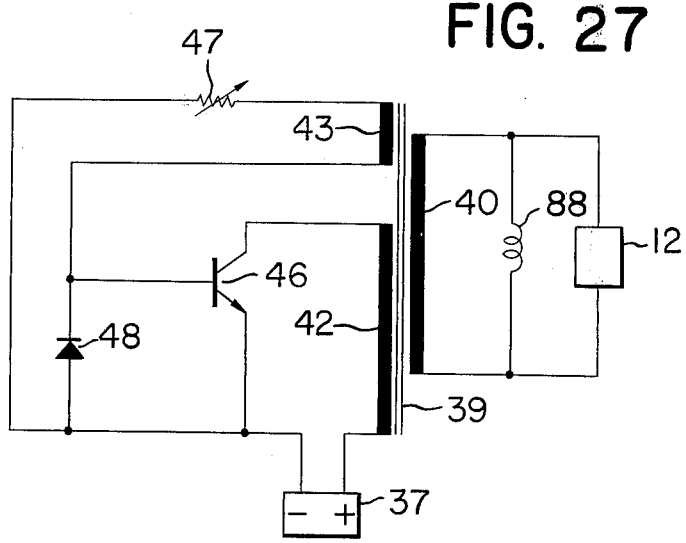

FIG. 27 shows an embodiment of the present invention which is a modification of he embodiment in FIG. 25, using a single transistor drive circuit. Numerals in the figure correspond to like numerals in FIG. 25.

In this embodiment, a drive current is supplied to the drive coil 12 during the half period in which the transistor 46 is in the on state, but the effect of the use of the inductance element 88 is the same as in the case shown in FIG. 25.

In FIGS. 25 and 27, the inductance element 88 can be replaced by a transformer 39 to achieve the same effect. The transformer 39 considered in terms of an equivalent circuit is an excited inductance element connected in parallel with the drive coil 12. Therefore, the same effect can be achieved by increasing the excited inductance to a desired value, more specifically, adjusting the gap provided in the iron core of the transformer 39 to a desired value.

In the embodiment shown in FIGS. 25 and 27, an inductance element 88 is inserted on the output side of the secondary winding of the transformer of the drive device, but needless to say, the inductance element can be inserted on the side of the primary winding, or a tertiary winding can be additionally provided.

Although this invention has been described in connection with its examples, it will be apparent that the invention is not limited specifically thereto but may be modified and varied without departing from the scope of the novel concepts of this invention.

What is claimed is:

1. An electric vibration type compressor comprising, a mechanical vibration system having a drive coil and at least one spring resonating with the vibration of the drive coil, and an electric vibration system having at least one switching element which switches when:

$$I_C \geq h_{FE} I_B$$

wherein $I_C$: the output current of the switching element $I_B$: the control current of the switching element $h_{FE}$: the current amplification factor of the switching element, said electric vibration system being connected to said drive coil to perform switching control in accordance with the variation in resistance of said drive coil in relation to the vibration of the drive coil, siad electric vibration system further comprising control means for controlling the waveform of the current $I_B$ and $I_C$ which are fed to the switching element to a first value during the initial starting period and to a second value during subsequent operation such that the time measured from when the switching element is turned on till the switching element is turned off is substantially the same for both the initial starting period as well as for the steady operation of the electric vibration type compressor.

2. The electric vibration type compressor as in claim 1 and wherein said control means increases the current $I_B$ during a predetermned period after the switching element has been switched to its on state.

3. The electric vibration type compressor as in claim 2 and wherein said electric vibration system further comprises a DC voltage source, and wherein said control means applies said DC voltage to the input terminal of the switching element at the moment when the switching element is turned to its on state, and then cancels the effect of the application of the DC voltage at a predetermined time thereafter.

4. The electric vibration type compressor as in claim 3 and wherein said control means maintains the applied DC voltage at a constant level after its rise at the moment of switching.

5. The electric vibration type compressor as in claim 3 wherein said control means includes by pass means for concelling the effect of the application of the DC voltage by by passing the current supplied by the application of the DC voltage.

6. The electric vibration type compressor as in claim 3 wherein said control means includes feedback means for supplying an input terminal of the switching element with a feedback current produced by the switching-on of the switching element at the moment of switching-on, and wherein the current which is supplied by the application of said DC voltage is superimposed on said feedback current.

7. The electric vibration type compressor as in claim 6 wherein said control means includes by pass means for bypassing the current supplied by the application of the said DC voltage after the lapse of a predetermined time.

8. The electric vibration type compressor as in claim 2 and wherein said control means further comprises discharge means for discharging into the input terminal of the switching element a previously accumulated electric charge at the moment when the switching element is turned to its on state.

9. The electric vibration type compressor as in claim 8 wherein said control means includes feedback means for feeding the input terminal of the switching element a feedback current produced by switching-on of the switching element at the moment of switching-on, and wherein the discharge current of said previously accumulated electric charge is superimposed on said feedback current.

10. The electric vibration type compressor as in claim 8 and wherein said previously accumulated electric charge is built up during the period when the switching element which is to be turned on remains in the off state.

11. The electric vibration type compressor as in claim 9 and wherein said previously accumulated electric charge is built up during the period when the switching element which is to be turned on remains in the off state.

12. The electric vibration type compressor as in claim 11 wherein said electric vibration system includes an output circuit in which said drive coil acts as a load, and wherein said discharge means includes a capacitor and a diode connected in series circuit, said series circuit being connected in parallel with said output circuit, such that said capacitor is charged when voltage is applied to the output circuit in a forward direction with respect to the diode, and when a voltage is applied to the output circuit in a reverse direction with respect to said diode, said capacitor is discharged into the input terminal of the switching element to turn it on.

13. The electric vibration type compressor as in claim 8 wherein said electric vibration system includes an input circuit coupled to the switching element, and wherein said discharge means includes a capacitor inserted in said input circuit, said capacitor being charged with a feedback current from the point of time when the switching element is turned off, said feedback current being superimposed on the input circuit, and said capacitor being charged to the opposite polarity from the point of time when the switching element is turned on.

14. The electric vibration type compressor as in claim 8 wherein said electric vibration system includes at least two alternately controlled switching elements, each of which has its own input circuit, and wherein said discharge means includes a capacitor inserted in the input circuit of either of the switching elements, said capacitor being charged by a feedback current supplied from the moment when one switching element is turned to the on state, and supplies a superimposed feedback current to the input circuit of the other switching element by discharging the charge built up by the capacitor at the moment when said one switching element is turned off.

15. The electric vibration type compressor as in claim 14 and wherein said electric vibration system further comprises a transformer which connects said input circuits to each other.

16. The electric vibration type compressor as in claim 14 wherein each of said input circuits includes a capacitor and each of said capacitors are respectively connected in series with the input terminals of their respective switching elements.

17. The electric vibration type compressor as in claim 15 and further comprising diodes connected in parallel with each of said capacitors.

18. The electric vibration type compressor as in claim 2 and wherein said electric vibration system includes an output circuit in which said drive coil acts as a load, and wherein said control means includes a differentiation circuit for differentiating the load current supplied to the output circuit and supplies that current to the input terminal of the switching element at the moment when the switching element is turned to the on state.

19. The electric vibration type compressor as in claim 18 wherein said control means includes feedback means for feeding the input terminal of the switching element with a feedback current produced by switching-on of the switching element at the moment of switching-on, and wherein the differentiated current is superimposed on said feedback current.

20. The electric vibration type compressor as in claim 18 and further comprising a current transformer connected in series with the output circuit and wherein the differentiated current is obtained from the secondary winding of said current transformer.

21. The electric vibration type compressor as in claim 19 and further comprising a current transformer connected in series with the output circuit and wherein the differentiated current is obtained from the secondary winding of said current transformer.

22. The electric vibration type compressor as in claim 20 wherein the electric vibration system includes at least two alternately controlled switching elements each of which has its own input circuit, and further comprising a transformer connecting together said two input circuits, and wherein said secondary winding of said current transformer is connected only to one side of said input circuits.

23. The electric vibration type compressor as in claim 21 wherein the electric vibration system includes at least two alternately controlled switching elements each of which has its own input circuit, and further comprising a transformer connecting together said two input circuits, and wherein said secondary winding of said current transformer is connected only to one side of said input circuits.

24. The electric vibration type compressor as in claim 1 wherein said control means decreases the current $I_B$ at a predetermined time after the switching element is turned on, by setting the current $I_B$ to a sufficiently large value.

25. The electric vibration type compressor as in claim 24 wherein said electric vibration system includes an output circuit in which said drive coil acts as a load, an input circuit coupled to said switching element, a transformer having its primary winding connected in parallel with said output circuit and its secondary winding connected in the input circuit, whereby a voltage induced across the secondary winding of the transformer is decreased at a predetermined time after the switching element is turned on.

* * * * *